United States Patent
Anzures

(10) Patent No.: US 9,852,761 B2
(45) Date of Patent: Dec. 26, 2017

(54) DEVICE, METHOD, AND GRAPHICAL USER INTERFACE FOR EDITING AN AUDIO OR VIDEO ATTACHMENT IN AN ELECTRONIC MESSAGE

(75) Inventor: Freddy Allen Anzures, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 11 days.

(21) Appl. No.: 12/566,656

(22) Filed: Sep. 24, 2009

(65) Prior Publication Data

US 2010/0235746 A1    Sep. 16, 2010

Related U.S. Application Data

(60) Provisional application No. 61/210,336, filed on Mar. 16, 2009.

(51) Int. Cl.
*G11B 27/031* (2006.01)
*H04L 12/58* (2006.01)
(Continued)

(52) U.S. Cl.
CPC .......... *G11B 27/031* (2013.01); *G06F 3/0488* (2013.01); *G06F 3/04883* (2013.01);
(Continued)

(58) Field of Classification Search
CPC ............ G06Q 10/107; H04M 1/72555; H04M 1/72583; H04M 2250/22; H04L 51/00;
(Continued)

(56) References Cited

U.S. PATENT DOCUMENTS 5,760,767 A    6/1998  Shore et al. .................. 345/328
6,262,724 B1   7/2001  Crow et al.
(Continued)

FOREIGN PATENT DOCUMENTS

| | | | |
|---|---|---|---|
| CN | 1802857 A | 7/2006 | |
| GB | 2 306 750 A | 5/1997 | ........... G11B 27/028 |
| WO | WO 2008/083360 A1 | 7/2008 | ............. G06F 3/048 |

OTHER PUBLICATIONS

HTC Corporation, "HTC Touch Pro—User Manual," Copyright © 2008 HTC Corporation, 152 pages, http://member.america.htc.com/download/Web_materials/Manual/Verizon_Touch_Pro/081024_RaphaelC_VZW_English_Manual.pdf>.
(Continued)

*Primary Examiner* — Nicholas Ulrich
(74) *Attorney, Agent, or Firm* — Dentons US LLP

(57) ABSTRACT

A method is performed at a multifunction device with a display and a touch-sensitive surface. User selection of an audio or video file to be sent in an electronic message is detected. In response to detecting a first input by the user, an audio or video file editing interface is displayed. The editing interface comprises: a time bar, a user-adjustable begin-edit icon, and a user-adjustable end-edit icon. The distance between the user-adjustable begin-edit icon and the user-adjustable end-edit icon is constrained to be equal to or less than a distance that corresponds to a predefined maximum allowable size for the file. In response to detecting a second input by the user on the touch-sensitive surface, at least one of the begin-edit icon and the end-edit icon is adjusted in the audio or video file editing interface. The audio or video file is edited to a shorter.

18 Claims, 41 Drawing Sheets

(51) Int. Cl.
*G06F 3/0488* (2013.01)
*G06Q 10/10* (2012.01)
*H04M 1/725* (2006.01)
*G11B 27/34* (2006.01)
*G06F 3/0485* (2013.01)
*G11B 27/034* (2006.01)

(52) U.S. Cl.
CPC .......... *G06Q 10/107* (2013.01); *G11B 27/34* (2013.01); *H04L 51/04* (2013.01); *H04L 51/063* (2013.01); *H04M 1/72555* (2013.01); *H04M 1/72583* (2013.01); *G06F 3/04855* (2013.01); *G11B 27/034* (2013.01); *H04M 2250/22* (2013.01)

(58) Field of Classification Search
CPC ....... H04L 51/04; H04L 51/36; H04L 51/063; H04N 1/00212; G11B 27/031; G11B 27/034; G06F 3/04855; G06F 3/04883
USPC .............. 715/864, 725, 702, 723, 863, 752; 709/206
See application file for complete search history.

(56) References Cited

U.S. PATENT DOCUMENTS

| | | | |
|---|---|---|---|
| 6,597,375 B1 | 7/2003 | Yawitz | 345/723 |
| 7,117,210 B2* | 10/2006 | DeSalvo | |
| 7,739,599 B2* | 6/2010 | Patten et al. | 715/723 |
| 7,769,819 B2* | 8/2010 | Lerman et al. | 709/217 |
| 7,877,454 B1* | 1/2011 | Hunter | 709/207 |
| 7,890,585 B2* | 2/2011 | Lowe | 709/206 |
| 7,956,847 B2 | 6/2011 | Christie | |
| 2002/0031262 A1* | 3/2002 | Imagawa et al. | 382/190 |
| 2002/0154158 A1 | 10/2002 | Fukuda et al. | 345/723 |
| 2003/0055844 A1* | 3/2003 | Rudd et al. | 707/200 |
| 2004/0068545 A1* | 4/2004 | Daniell et al. | 709/206 |
| 2005/0018050 A1* | 1/2005 | Yaji et al. | 348/207.99 |
| 2006/0005135 A1* | 1/2006 | Vetelainen | G11B 27/34 715/723 |
| 2006/0075033 A1* | 4/2006 | Bienstock et al. | 709/206 |
| 2006/0168016 A1* | 7/2006 | Barrett | 709/206 |
| 2007/0106952 A1 | 5/2007 | Matas et al. | 715/764 |
| 2007/0245243 A1* | 10/2007 | Lanza et al. | 715/723 |
| 2007/0274683 A1 | 11/2007 | Shore | 386/96 |
| 2008/0016160 A1* | 1/2008 | Walter et al. | 709/206 |
| 2008/0167070 A1* | 7/2008 | Ishii | H04M 1/72555 455/556.1 |
| 2008/0313290 A1* | 12/2008 | Park | H04N 1/00214 709/206 |
| 2008/0313541 A1* | 12/2008 | Shafton et al. | 715/725 |
| 2009/0143141 A1* | 6/2009 | Wells et al. | 463/37 |
| 2009/0278806 A1* | 11/2009 | Duarte et al. | 345/173 |

OTHER PUBLICATIONS

Sony Ericsson, "Camera—Capturing, saving and editing," Sony Ericsson Mobile Communications AB, May 2008, 19 pages, http://www.mcmoss.net/twiki4.2/pub/Main/InstructionManuals/C902_GSG_Camera_EN_1208_6275_1.pdf>.

International Search Report and Written Opinion dated Apr. 19, 2010, received in International Application No. PCT/US2010/021925, which corresponds to U.S. Appl. No. 12/566,656.

Hollington, J., "iPhone Gems: Every Voice Recorder, Reviewed," ilounge.com, Aug. 4, 2008, http://www.ilounge.com/index.php/articles/comments/iphone-gems-every-voice-recorder-reviewed, 35 pages.

Kevin, "iPhone audio recording apps in the App Store," iPhone Footprint, Nov. 10, 2008, http://www.iphonefootprint.com/2008/11/iphone-audio-recording-apps-in-the-app-store/, 8 pages.

Kevin, "Video recording application for iPhone 3G," iPhone Footprint, Oct. 1, 2008, http://www.iphonefootprint.com/2008/10/video-recording-application-for-iphone-3g/, 5 pages.

NCH, "Voice Recording Software," NCH Software, Feb. 17, 2009, http://www.nch.com.au/software/voxrec.html?gclid=CKn4yPL835gCFQIMswod3nm7dQ, 3 pages.

Winberg, P., "An MMST—Integrated MMS Editor," Master's Thesis, Umeå University, Apr. 27, 2006, 61 pages.

Decision to Grant received for European Patent Application No. 10702375.6, dated Mar. 24, 2016, 2 pages.

Intention to Grant received for European Patent Application No. 10702375.6, dated Oct. 26, 2015, 7 pages.

International Preliminary Report on Patentability received for PCT Patent Application No. PCT/US2010/021925, dated Sep. 29, 2011, 7 pages.

Notice of Allowance received for Chinese Patent Application No. 201080018968.7, dated Apr. 2, 2015, 2 pages (Official Copy only). {See Communication under 37 CFR § 1.98(a) (3)}.

Office Action received for Chinese Patent Application No. 201080018968.7, dated Dec. 3, 2013, 4 pages (English Translation only).

Office Action received for Chinese Patent Application No. 201080018968.7, dated Oct. 16, 2014, 9 pages (3 pages of English Translation and 6 pages of Official Copy).

Office Action received for European Patent Application No. 10702375.6, dated Nov. 20, 2013, 6 pages.

The Human Manual, "LG KF700—Messaging—MMS/Picture—MobilePhoneTraining", 8:40 minutes video, available at <http://www.youtube.com/watch?v=INroykhPZf0>, Apr. 12, 2008, 3 pages.

* cited by examiner

DEVICE, METHOD, AND GRAPHICAL USER INTERFACE FOR EDITING AN AUDIO OR VIDEO ATTACHMENT IN AN ELECTRONIC MESSAGE

RELATED APPLICATIONS

This application claims priority to U.S. Provisional Patent Application No. 61/210,336, "Device, Method, and Graphical User Interface for Editing an Audio or Video Attachment in an Electronic Message," filed on Mar. 16, 2009, which is incorporated by reference herein in its entirety.

TECHNICAL FIELD

The disclosed embodiments relate generally to multifunction devices with displays and touch-sensitive surfaces operable to edit audio or video attachments to electronic messages, such as emails and text messages.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display, including user audio or video attachments to electronic messages, such as emails and text messages. However, when sending audio or video in electronic messages, file size limitations can impose problems. As such, reducing the size of audio or video files prior to sending the file may be desirable. Further, it is useful to allow a user to select a subset of an audio or video file to send since reduced transmission times saves energy. This latter consideration is particularly important in battery-operated devices.

Efficiently performing these edits with inputs on a touch pad or touch screen display, however, can be cumbersome.

Accordingly, there is a need for computing devices with faster, more efficient methods and interfaces for editing audio or video attachments to electronic messages, such as emails and text messages. For battery-operated computing devices, such methods and interfaces conserve power by reducing transmission time, thereby increasing the time between battery charges.

SUMMARY

The above deficiencies and other problems associated with multifunction devices with displays and touch-sensitive surfaces that send audio or video attachments with electronic messages, such as emails and text messages, are reduced or eliminated by the disclosed devices.

In some embodiments, the device is a desktop computer. In some embodiments, the device is portable (e.g., a notebook computer or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. The method includes: detecting a user selection of an audio or video file to be sent in an electronic message, wherein the audio or video file has an initial duration; detecting a first input by the user; and, in response to detecting the first input by the user, displaying an audio or video file editing interface. The audio or video file editing interface comprises: a time bar with a length that represents the audio or video file with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video file. The method also includes: detecting a second input by the user on the touch-sensitive surface; in response to detecting the second input by the user on the touch-sensitive surface, adjusting at least one of the begin-edit icon and the end-edit icon in the audio or video file editing interface; and editing the audio or video file to a second shorter duration in accordance with the adjustments to the begin-edit icon and the end-edit icon in the audio or video file editing interface.

In accordance with some embodiments, a graphical user interface on a multifunction device with a display, a touch-sensitive surface, a memory, and one or more processors to execute one or more programs stored in the memory comprises an audio or video file editing interface that includes: a time bar with a length that represents the audio or video file with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video file. A user selection of an audio or video file to be sent in an electronic message is detected, wherein the audio or video file has an initial duration. In response to detecting a first input by the user, the audio or video file editing interface is displayed. In response to detecting a second input by the user on the touch-sensitive surface, at least one of the begin-edit icon and the end-edit icon in the audio or video file editing interface is adjusted. The audio or video file is edited to a second shorter duration in accordance with the adjustments to the begin-edit icon and the end-edit icon in the audio or video file editing interface.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: detecting a user selection of an audio or video file to be sent in an electronic message, wherein the audio or video file has an initial duration; detecting a first input by the user; and, in response to detecting the first input by the user, displaying an audio or video file editing interface. The audio or video file editing interface comprises: a time bar with a length that represents the audio or video file with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video file. The one or more programs also include instructions for: detecting a second input by the user on the touch-sensitive surface; in response to detecting the second input by the user on the touch-sensitive surface, adjusting at least one of the begin-edit icon and the end-edit icon in the audio or video file editing interface; and editing the audio or video file to a second shorter duration in accordance with the adjustments to the begin-edit icon and the end-edit icon in the audio or video file editing interface.

In accordance with some embodiments, a computer readable storage medium has stored therein instructions which when executed by a multifunction device with a display and a touch-sensitive surface, cause the device to: detect a user selection of an audio or video file to be sent in an electronic message, wherein the audio or video file has an initial duration; detect a first input by the user; and, in response to detecting the first input by the user, display an audio or video file editing interface. The audio or video file editing interface comprises: a time bar with a length that represents the audio or video file with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video file. The instructions also cause the device to: detect a second input by the user on the touch-sensitive surface; in response to detecting the second input by the user on the touch-sensitive surface, adjust at least one of the begin-edit icon and the end-edit icon in the audio or video file editing interface; and edit the audio or video file to a second shorter duration in accordance with the adjustments to the begin-edit icon and the end-edit icon in the audio or video file editing interface.

In accordance with some embodiments, a multifunction device includes: a display; a touch-sensitive surface; means for detecting a user selection of an audio or video file to be sent in an electronic message, wherein the audio or video file has an initial duration; means for detecting a first input by the user; and, in response to detecting the first input by the user, means for displaying an audio or video file editing interface. The audio or video file editing interface comprises: a time bar with a length that represents the audio or video file with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video file. The device also includes: means for detecting a second input by the user on the touch-sensitive surface; in response to detecting the second input by the user on the touch-sensitive surface, means for adjusting at least one of the begin-edit icon and the end-edit icon in the audio or video file editing interface; and means for editing the audio or video file to a second shorter duration in accordance with the adjustments to the begin-edit icon and the end-edit icon in the audio or video file editing interface.

In accordance with some embodiments, an information processing apparatus for use in a multifunction device with a display and a touch-sensitive surface includes: means for detecting a user selection of an audio or video file to be sent in an electronic message, wherein the audio or video file has an initial duration; means for detecting a first input by the user; and, in response to detecting the first input by the user, means for displaying an audio or video file editing interface. The audio or video file editing interface comprises: a time bar with a length that represents the audio or video file with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video file. The device also includes: means for detecting a second input by the user on the touch-sensitive surface; in response to detecting the second input by the user on the touch-sensitive surface, means for adjusting at least one of the begin-edit icon and the end-edit icon in the audio or video file editing interface; and means for editing the audio or video file to a second shorter duration in accordance with the adjustments to the begin-edit icon and the end-edit icon in the audio or video file editing interface.

In accordance with some embodiments, a method is performed at a multifunction device with a display and a touch-sensitive surface. The method includes: displaying an electronic message being drafted by a user on the display, wherein the electronic message includes an audio or video attachment with an initial duration; detecting a first input by the user; and, in response to detecting the first input by the user, displaying an attachment editing interface. The attachment editing interface comprises: a time bar with a length that represents the audio or video attachment with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video attachment. The method also includes: detecting a second input by the user on the touch-sensitive surface; in response to detecting the second input by the user on the touch-sensitive surface, adjusting at least one of the begin-edit icon and the end-edit icon in the attachment editing interface; editing the audio or video attachment to a second shorter duration in accordance with the adjustments to the begin-edit icon and the end-edit icon in the attachment editing interface; detecting a third input by the user; and, in response to detecting the third input by the user, initiating sending of the electronic message. The electronic message includes the edited audio or video attachment with the second shorter duration.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: displaying an electronic message being drafted by a user on the display, wherein the electronic message includes an audio or video attachment with an initial duration; detecting a first input by the user; and, in response to detecting the first input by the user, displaying an attachment editing interface. The attachment editing interface comprises: a time bar with a length that represents the audio or video attachment with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video attachment. The one or more programs also include instructions for: detecting a second input by the user on the touch-sensitive surface; in response to detecting the second input by the user on the touch-sensitive surface, adjusting at least one of the begin-edit icon and the end-edit icon in the attachment editing interface; editing the audio or video attachment to a second shorter duration in accordance with the adjustments to the begin-edit icon and the end-edit icon in the attachment editing interface; detecting a third input by the user; and, in response to detecting the third input by the user, initiating sending of the electronic message. The electronic message includes the edited audio or video attachment with the second shorter duration.

In accordance with some embodiments, a computer readable storage medium has stored therein instructions which when executed by a multifunction device with a display and a touch-sensitive surface, cause the device to: display an electronic message being drafted by a user on the display, wherein the electronic message includes an audio or video attachment with an initial duration; detect a first input by the user; and, in response to detecting the first input by the user, display an attachment editing interface. The attachment editing interface comprises: a time bar with a length that represents the audio or video attachment with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video attachment. The instructions also cause the device to: detect a second input by the user on the touch-sensitive surface; in response to detecting the second input by the user on the touch-sensitive surface, adjust at least one of the begin-edit icon and the end-edit icon in the attachment editing interface; edit the audio or video attachment to a second shorter duration in accordance with the adjustments to the begin-edit icon and the end-edit icon in the attachment editing interface; detect a third input by the user; and, in response to detecting the third input by the user, initiate sending of the electronic message. The electronic message includes the edited audio or video attachment with the second shorter duration.

In accordance with some embodiments, a graphical user interface on a multifunction device with a display, a touch-sensitive surface, a memory, and one or more processors to execute one or more programs stored in the memory includes an electronic message application displaying an electronic message being drafted by a user on the display. The electronic message includes an audio or video attachment with an initial duration. In response to detecting a first input by the user, an attachment editing interface is displayed. The attachment editing interface comprises: a time bar with a length that represents the audio or video attachment with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video attachment. In response to detecting a second input by the user on the touch-sensitive surface, at least one of the begin-edit icon and the end-edit icon is adjusted in the attachment editing interface. The audio or video attachment is edited to a second shorter duration in accordance with the adjustments to the begin-edit icon and the end-edit icon in the attachment editing interface. In response to detecting a third input by the user, sending of the electronic message is initiated. The electronic message includes the edited audio or video attachment with the second shorter duration.

In accordance with some embodiments, a multifunction device includes: a display; a touch-sensitive surface; means for displaying an electronic message being drafted by a user on the display, wherein the electronic message includes an audio or video attachment with an initial duration; means for detecting a first input by the user; and, in response to detecting the first input by the user, means for displaying an attachment editing interface. The attachment editing interface comprises: a time bar with a length that represents the audio or video attachment with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video attachment. The device also includes: means for detecting a second input by the user on the touch-sensitive surface; in response to detecting the second input by the user on the touch-sensitive surface, means for adjusting at least one of the begin-edit icon and the end-edit icon in the attachment editing interface; means for editing the audio or video attachment to a second shorter duration in accordance with the adjustments to the begin-edit icon and the end-edit icon in the attachment editing interface; means for detecting a third input by the user; and, in response to detecting the third input by the user, means for initiating sending of the electronic message, wherein the electronic message includes the edited audio or video attachment with the second shorter duration.

In accordance with some embodiments, an information processing apparatus for use in a multifunction device with a display and a touch-sensitive surface includes: means for displaying an electronic message being drafted by a user on the display, wherein the electronic message includes an audio or video attachment with an initial duration; means for detecting a first input by the user; and, in response to detecting the first input by the user, means for displaying an attachment editing interface. The attachment editing interface comprises: a time bar with a length that represents the audio or video attachment with the initial duration, a user-adjustable begin-edit icon, and a user-adjustable end-edit icon. A distance between the user-adjustable begin-edit icon and the user-adjustable end-edit icon is less than the length of the time bar. The distance between the user-adjustable begin-edit icon and the user-adjustable end-edit icon is constrained to be equal to or less than a distance that corresponds to a predefined maximum allowable size for the audio or video attachment. The device also includes: means for detecting a second input by the user on the touch-sensitive surface; in response to detecting the second input by the user on the touch-sensitive surface, means for adjusting at least one of the begin-edit icon and the end-edit icon in the attachment editing interface; means for editing the audio or video attachment to a second shorter duration in accordance with the adjustments to the begin-edit icon and the end-edit icon in the attachment editing interface; means for detecting a third input by the user; and, in response to detecting the third input by the user, means for initiating sending of the electronic message, wherein the electronic message includes the edited audio or video attachment with the second shorter duration.

Thus, multifunction devices with displays and touch-sensitive surfaces are provided with efficient methods and interfaces for editing audio or video attachments to electronic messages, thereby increasing the effectiveness, efficiency, and user satisfaction with such devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
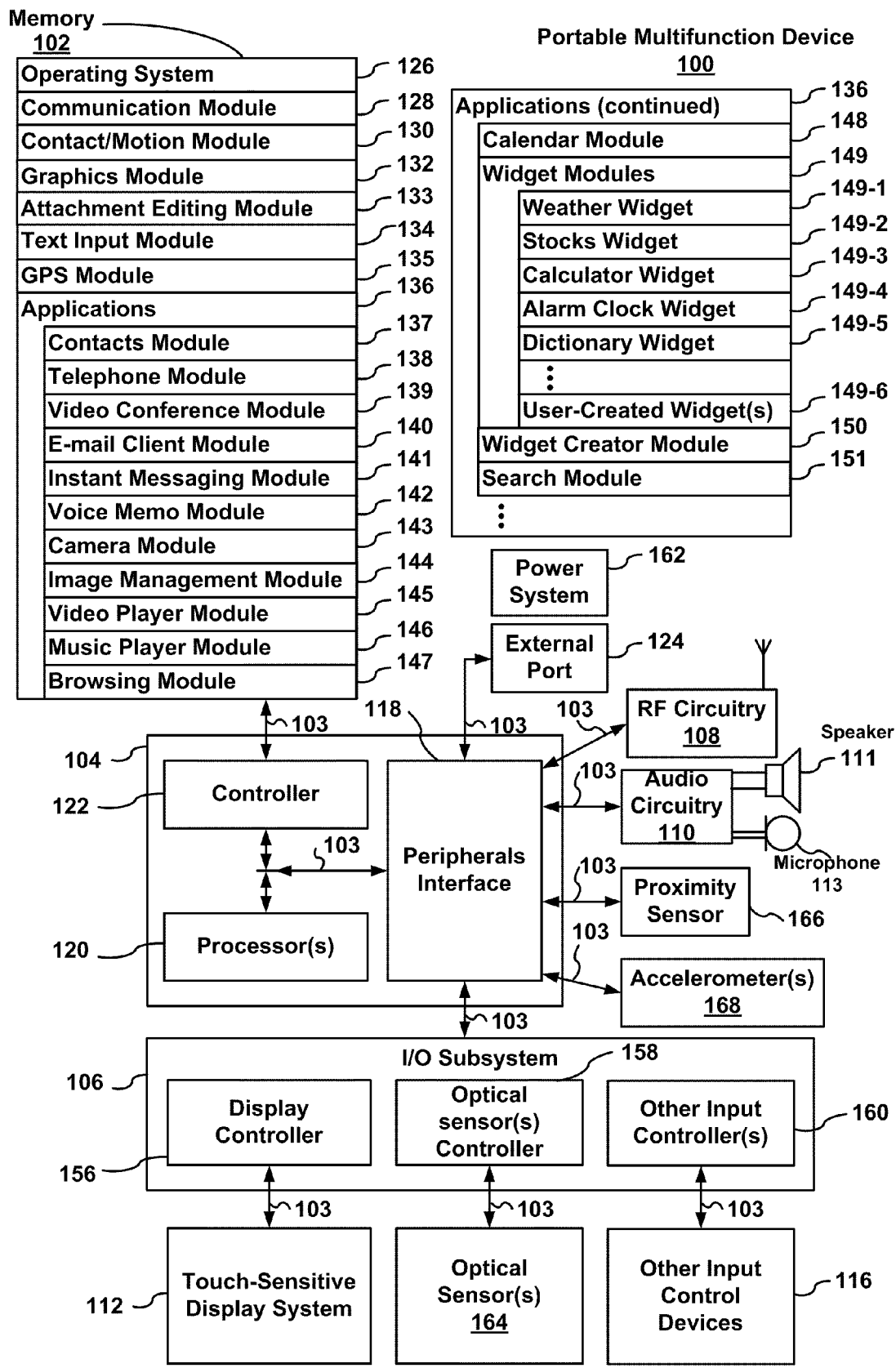
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Computer, Inc. of Cupertino, Calif.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a voice memo application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
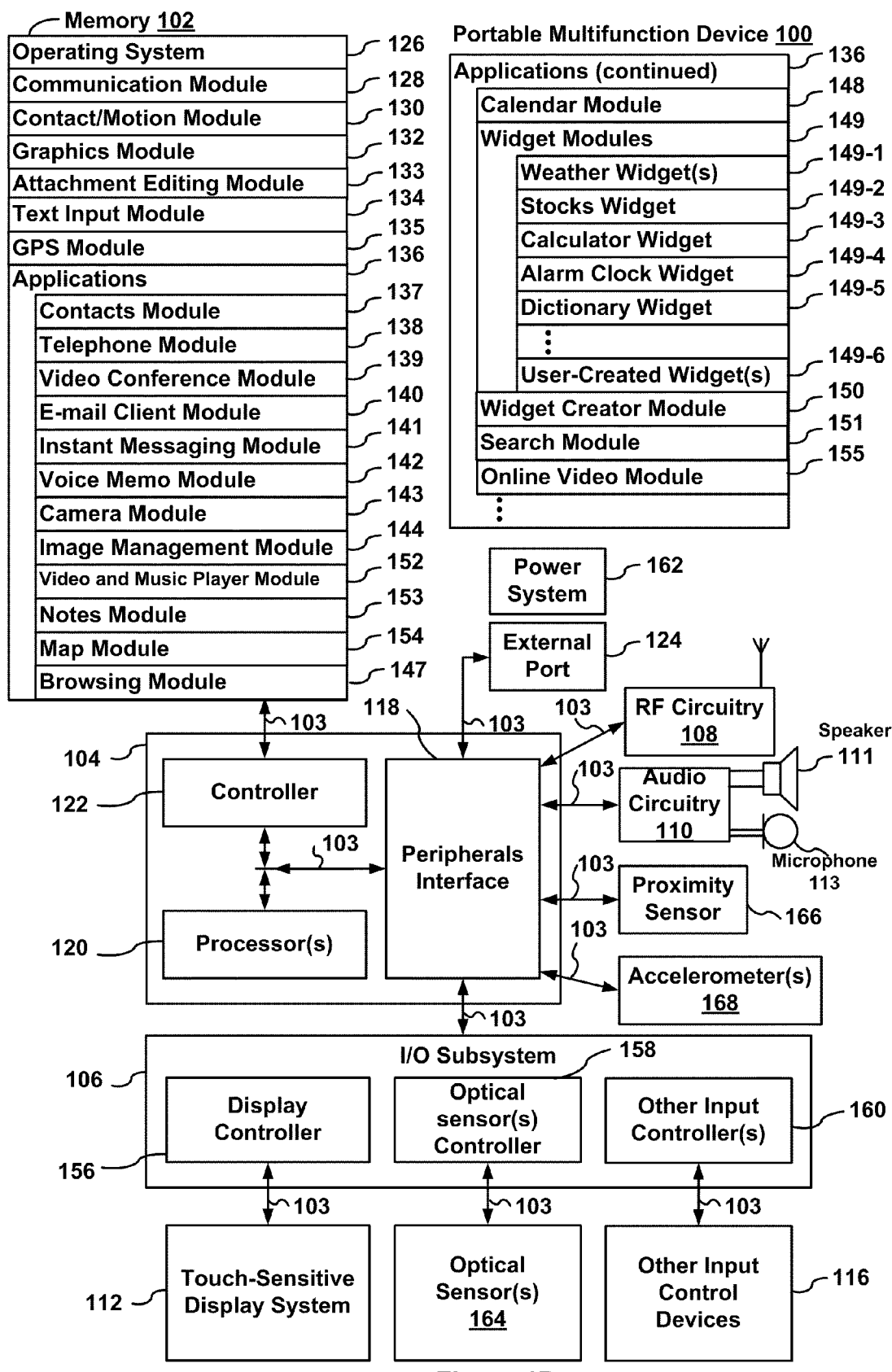

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Computer, Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a voice memo module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, e-mail client module 140 and instant messaging module 141, the voice memo module 142 may be used to record audio of lectures, dictation, telephone calls, conversations, performances, etc., and send the audio in an email or instant message.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
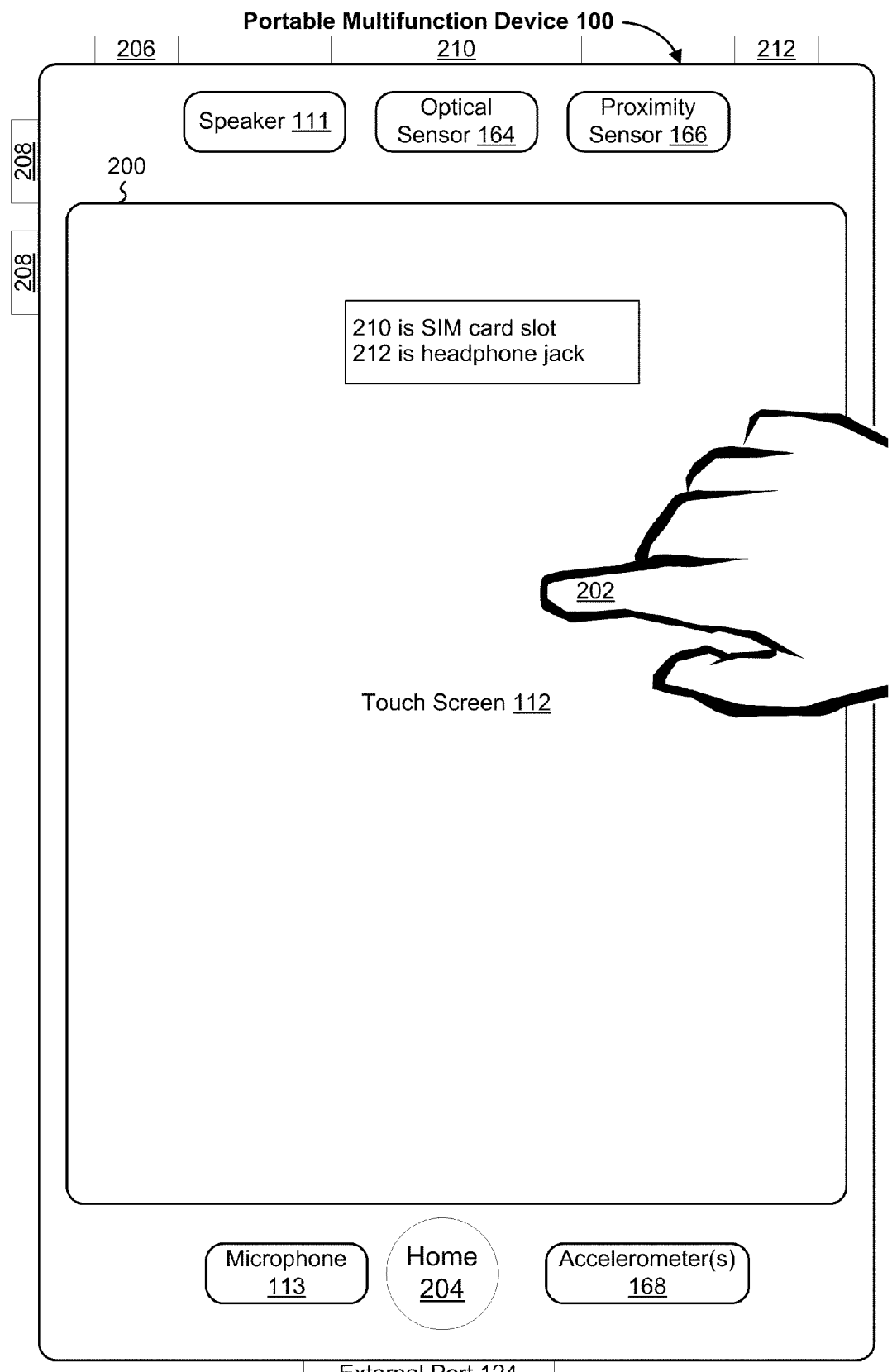
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
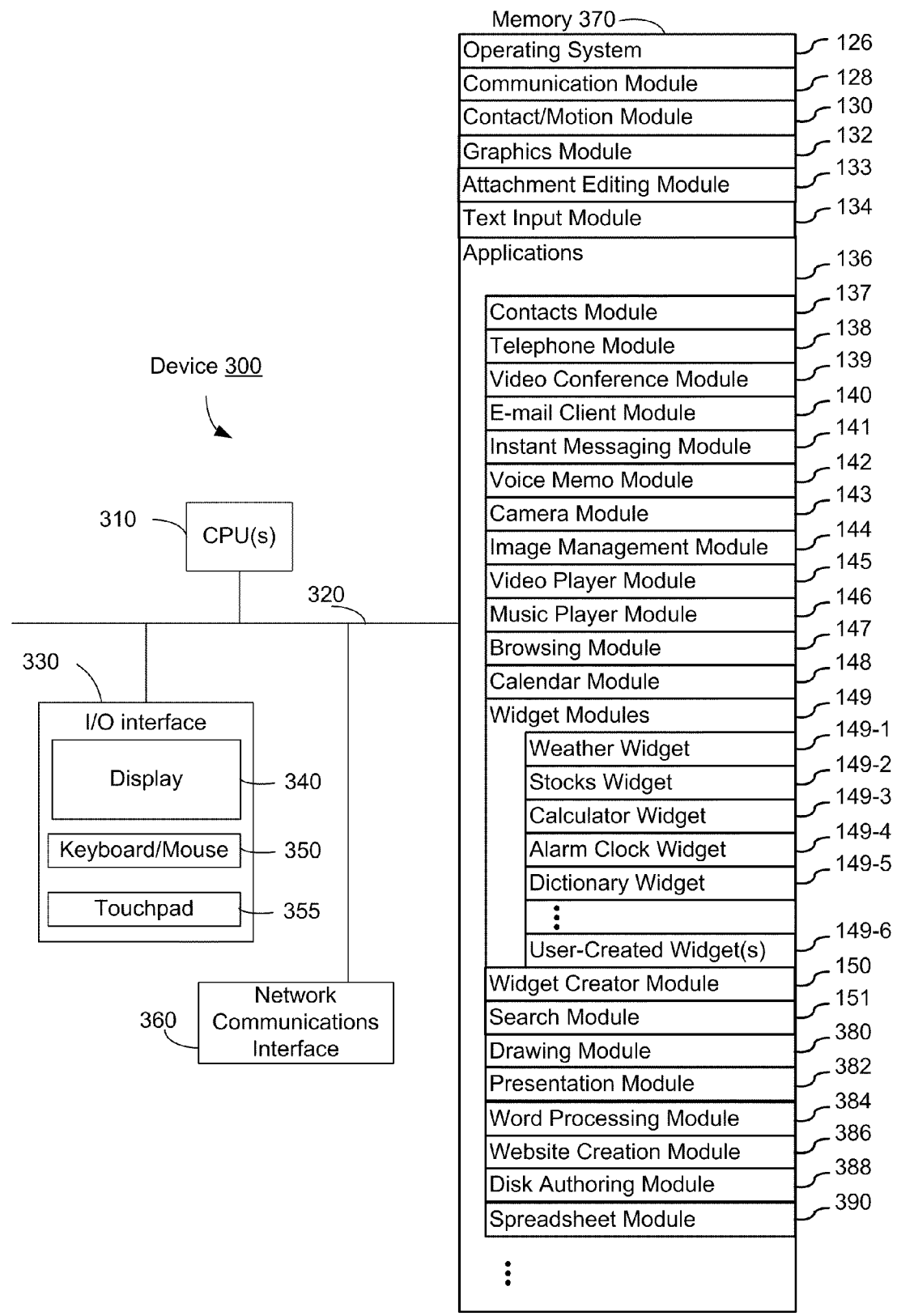
FIG. 3 is a block diagram of an exemplary computing device with a display and a touch-sensitive surface in accordance with some embodiments.

FIG. 3 is a block diagram of an exemplary computing device with a display and a touch-sensitive surface in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which in some embodiments is a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, spreadsheet module 390 and/or attachment editing module 133, while memory 102 of portable multifunction device 100 (FIG. 1) may not store these modules.

Referring briefly to attachment editing module 133, in some embodiments, attachment editing module 133 may be implemented as a sub-module of voice memo module 142. Alternatively, attachment editing module 133 may be a separate module from voice memo module 142, and be available for any appropriate module to utilize. Non-limiting examples of appropriate modules that may utilize the attachment editing module 133 include e-mail client module 140, image management module 144, video player module 145, and music player module 146. In short, any module that permits users to interact with audio or video files may utilize the attachment editing module. Accordingly, in some embodiments, attachment editing module 133 may be used on files that are not attachments to electronic messages.

To wit, attachment editing module 133 may alternatively be used on stand-alone audio or video files in any context. In some embodiments, such use may include when a user has selected an audio or video file to transmit on its own (i.e., without an accompanying message) to another user via any suitable transmission method, including without limitation, communication programs for email, HTTP, FTP, MMS, etc., over any suitable network, e.g. infrared file transfer, wireless networking protocols, traditional and modern Ethernet networks, etc.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
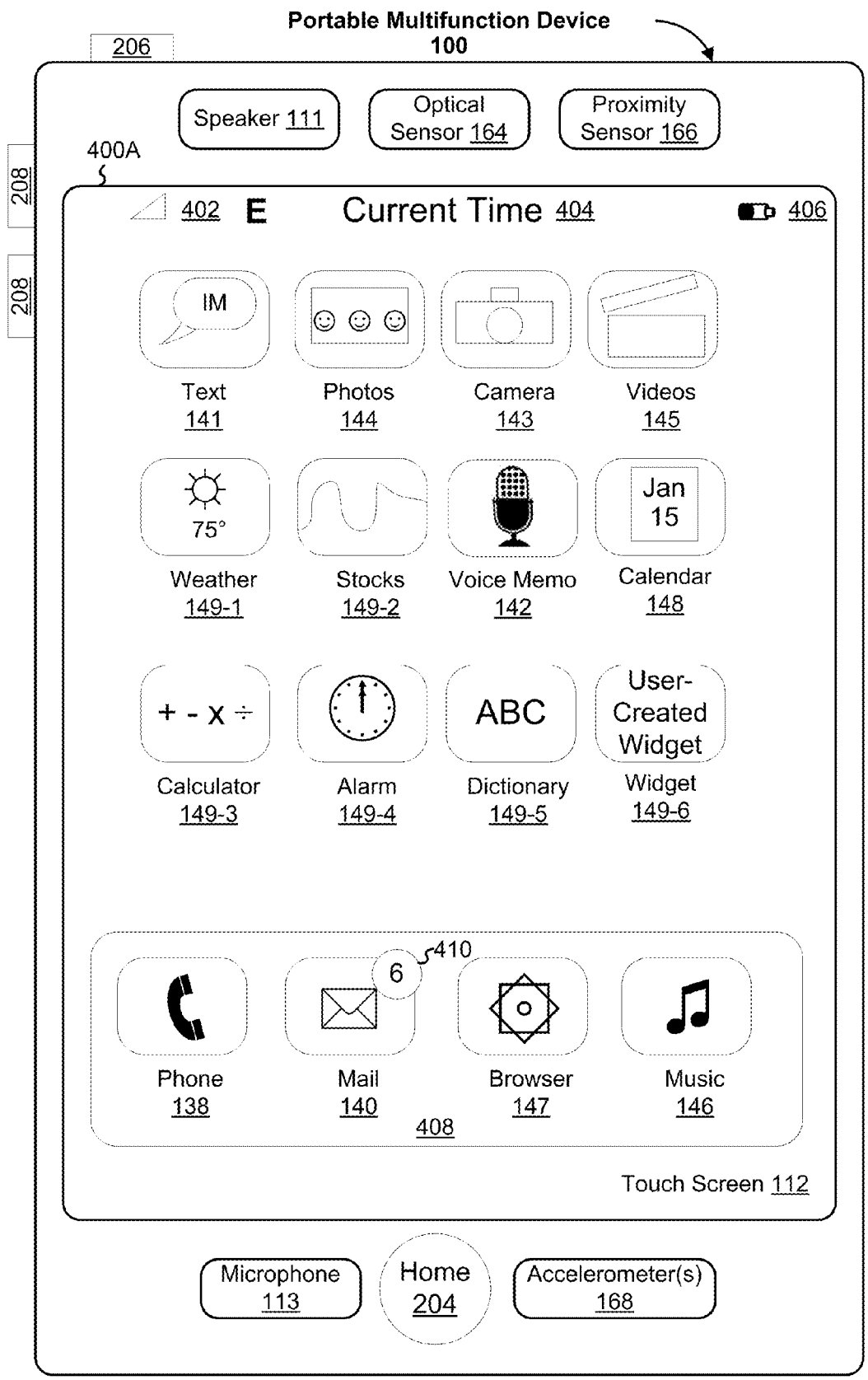
FIGS. 4A-4B illustrate exemplary user interfaces for a menu of applications on a portable multifunction device in accordance with some embodiments
Figure 4B:
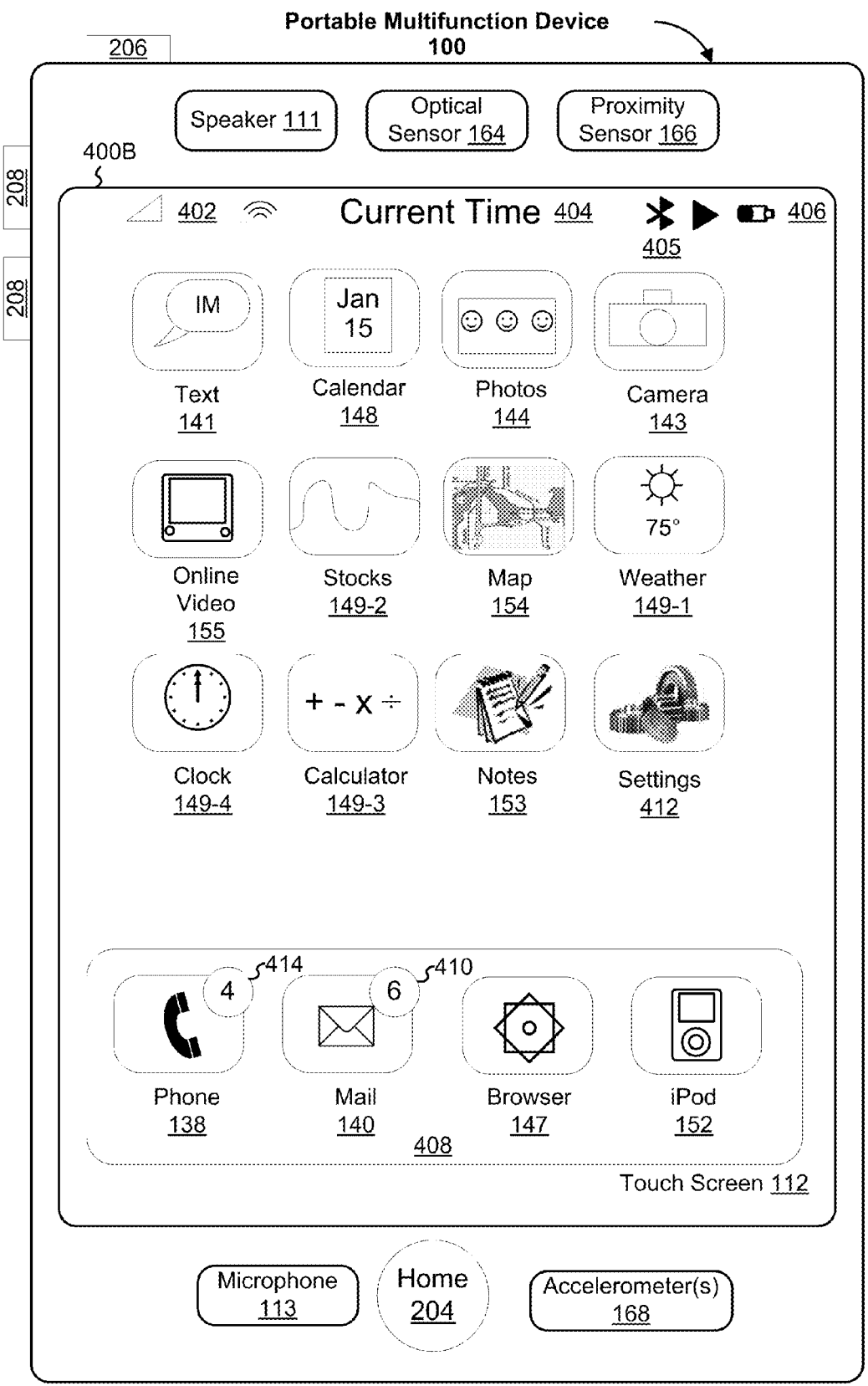

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Voice Memo 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for the device 100 and its various applications 136, as described further below;
Video and music player module 152, also referred to as iPod (trademark of Apple Computer, Inc.) module 152; and
Online video module 155, also referred to as YouTube (trademark of Google, Inc.) module 155.

Figure 4C:
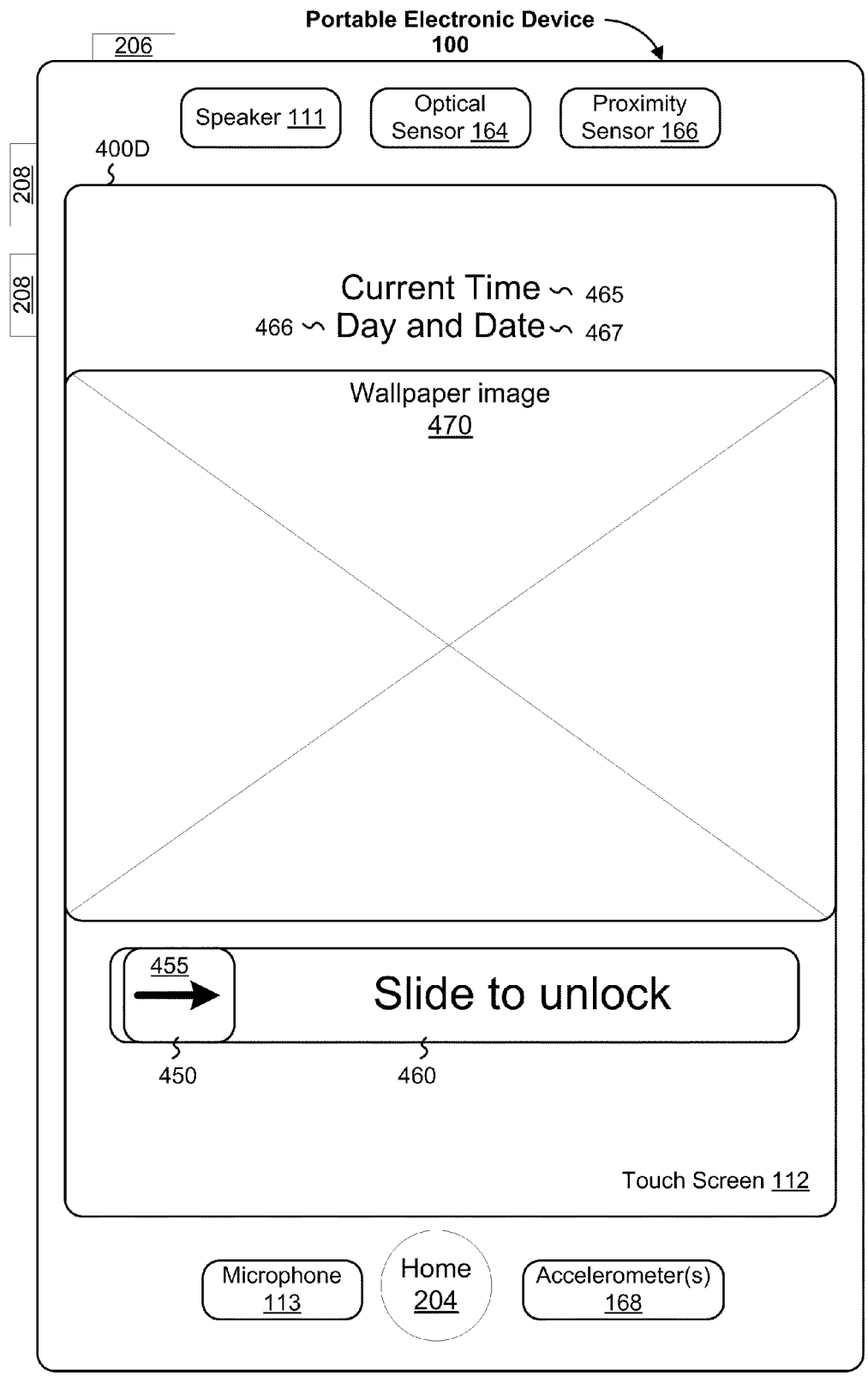
FIG. 4C illustrates an exemplary user interface for unlocking a portable electronic device in accordance with some embodiments.

FIG. 4C illustrates an exemplary user interface for unlocking a portable electronic device in accordance with some embodiments. In some embodiments, user interface 400C includes the following elements, or a subset or superset thereof:

Unlock image 450 that is moved with a finger gesture to unlock the device;
Arrow 455 that provides a visual cue to the unlock gesture;
Channel 460 that provides additional cues to the unlock gesture;
Time 465;
Day 466;
Date 467; and
Wallpaper image 470.

In some embodiments, the device detects contact with the touch-sensitive display (e.g., a user's finger making contact on or near the unlock image 450) while the device is in a user-interface lock state. The device moves the unlock image 450 in accordance with the contact. The device transitions to a user-interface unlock state if the detected contact corresponds to a predefined gesture, such as moving the unlock image across channel 460. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Attention is now directed towards exemplary embodiments of user interfaces ("UI") and associated processes that may be implemented on a computing device with a display and a touch-sensitive surface, such as device 300 or portable multifunction device 100.

Figure 5A:
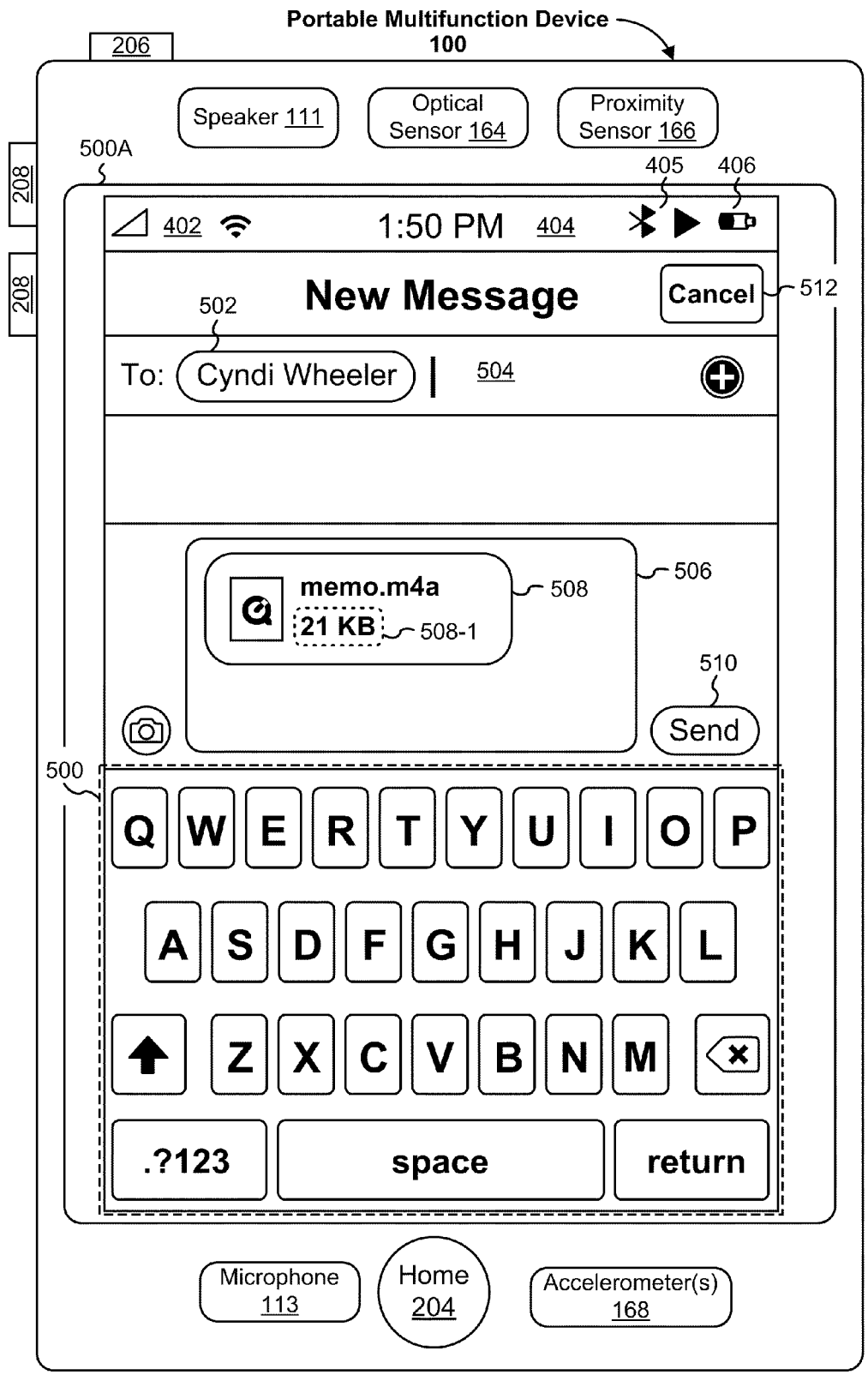
FIGS. 5A-5Q illustrate exemplary user interfaces for editing an audio or video attachment to an electronic message on a multifunction device with a display and a touch-sensitive surface in accordance with some embodiments.
Figure 5B:
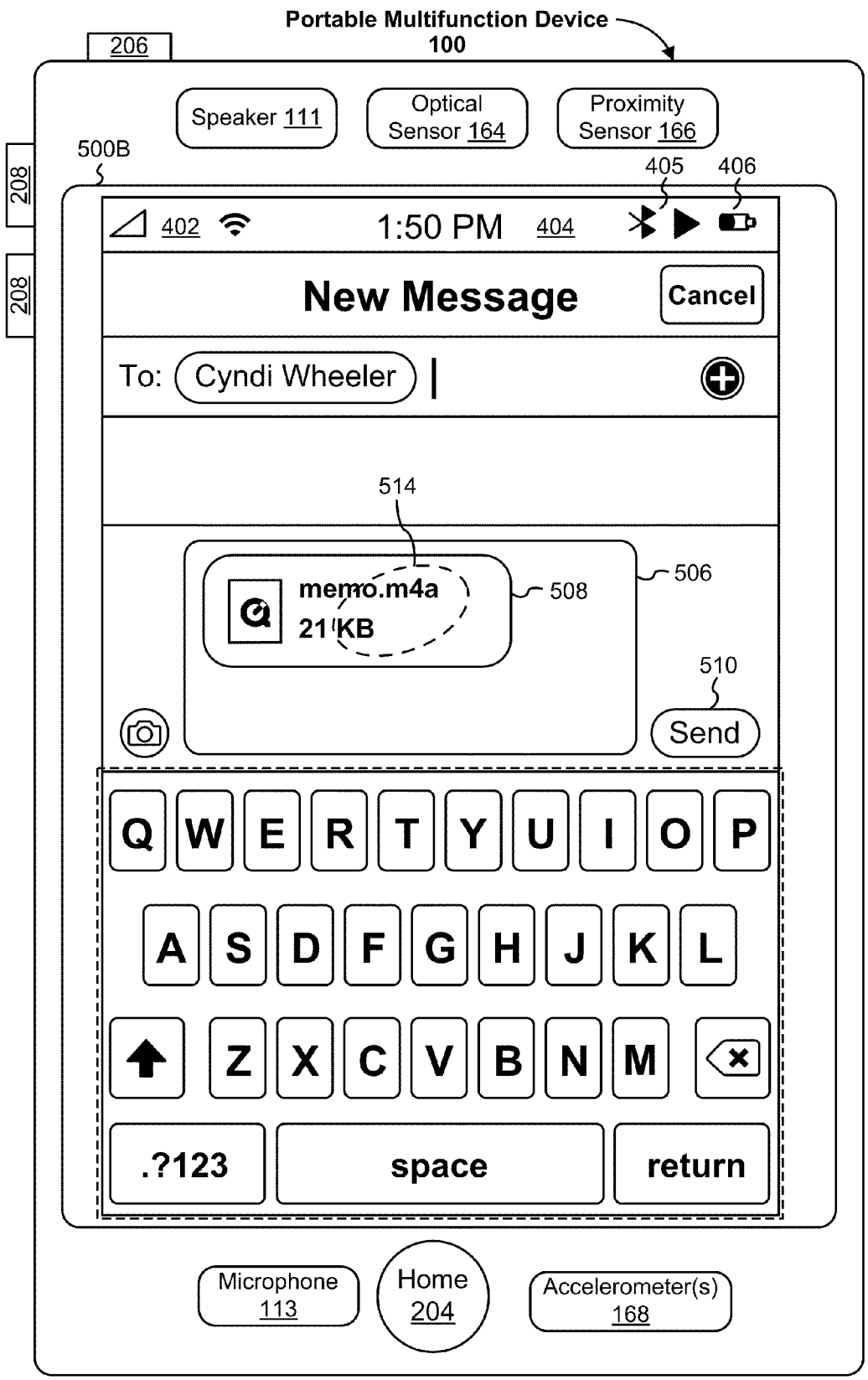
Figure 5C:
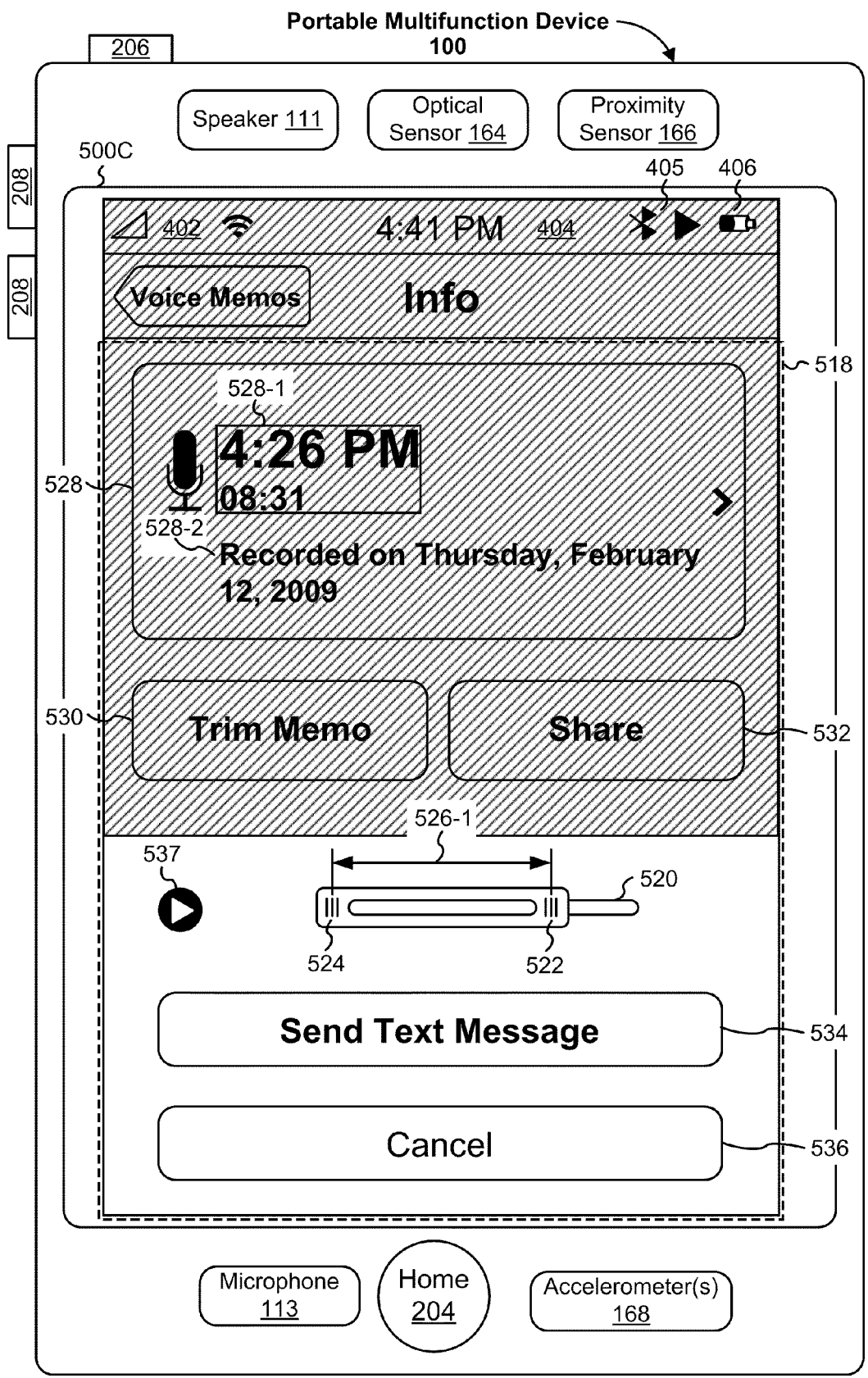
Figure 5D:
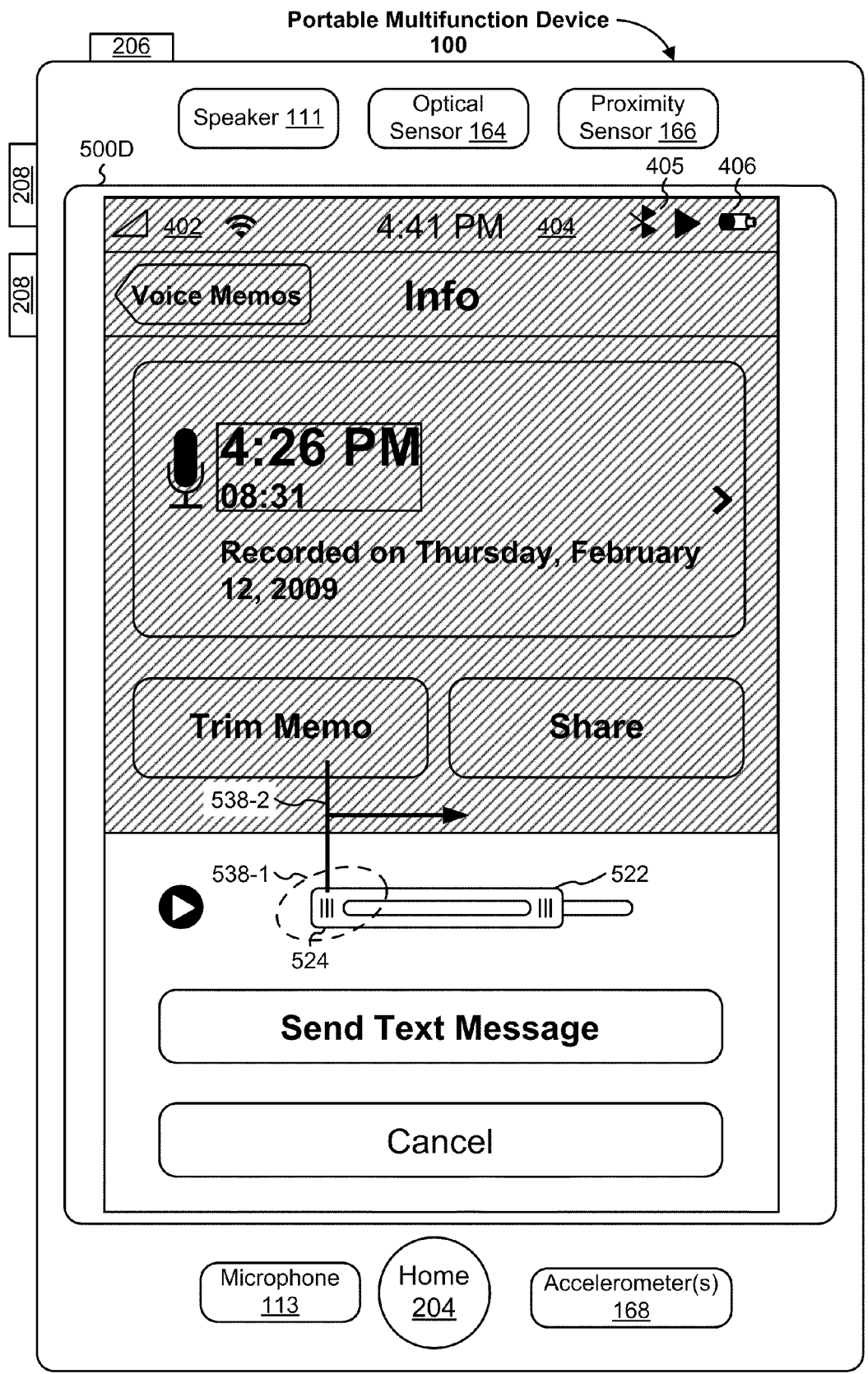
Figure 5E:
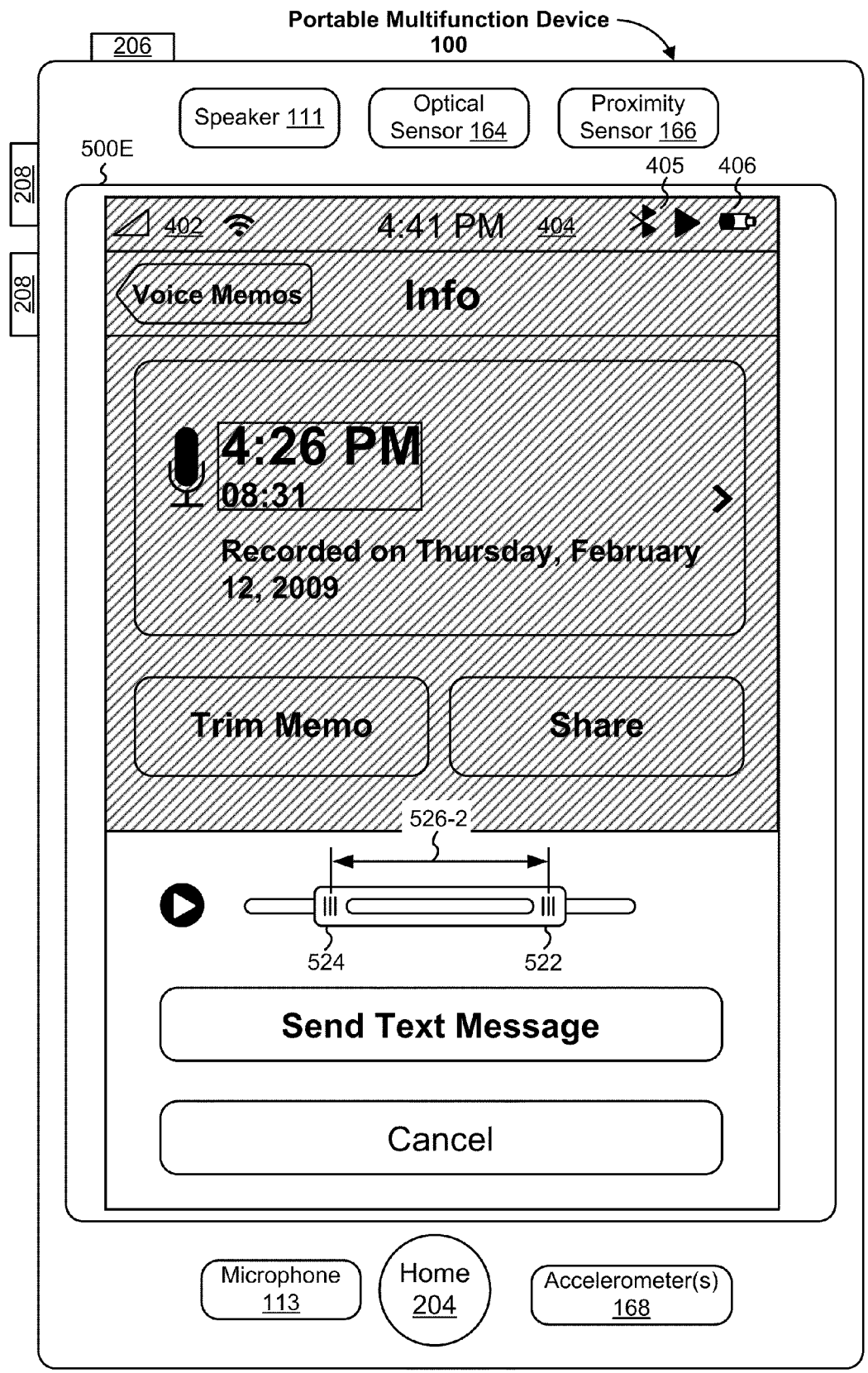
Figure 5F:
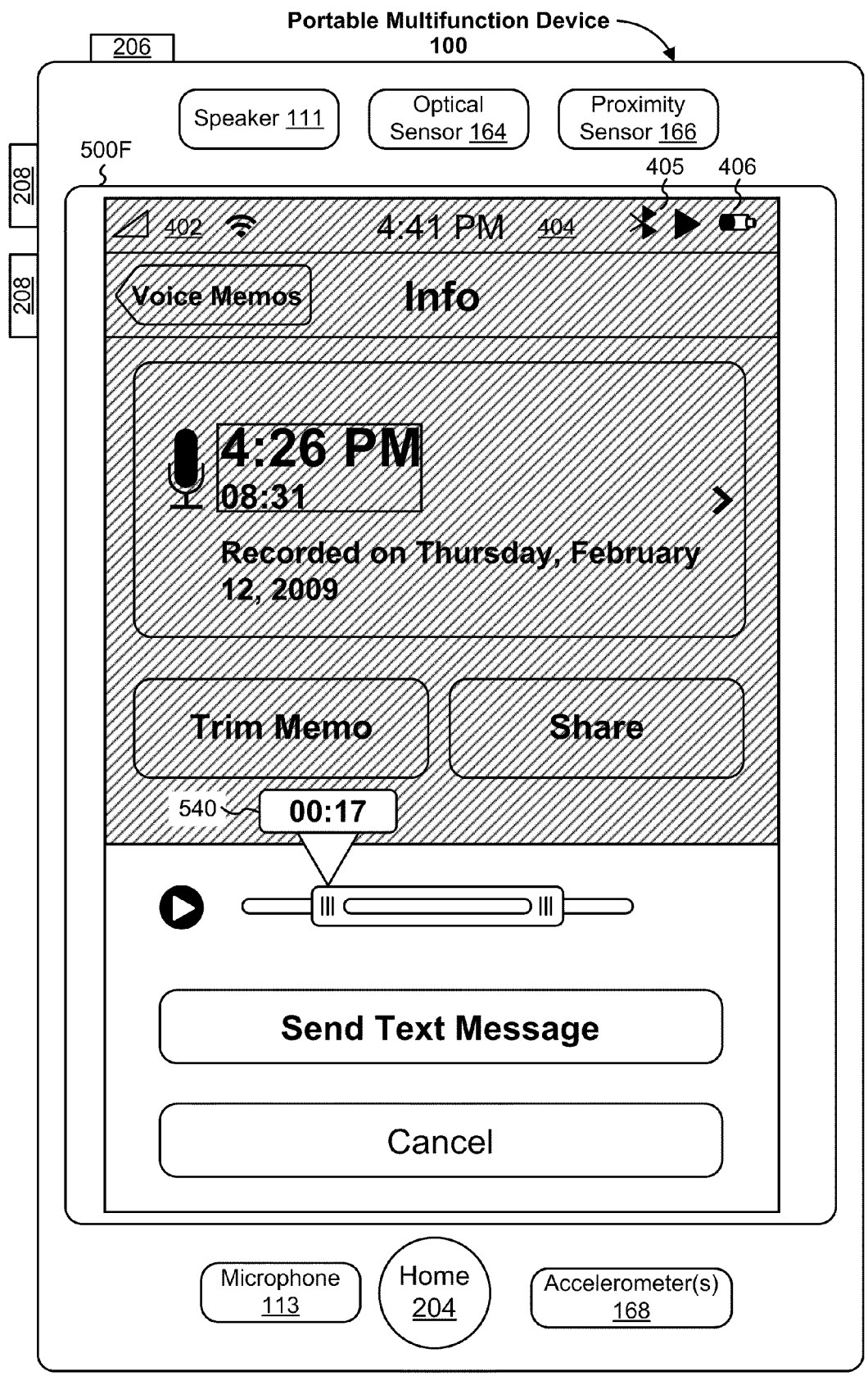
Figure 5G:
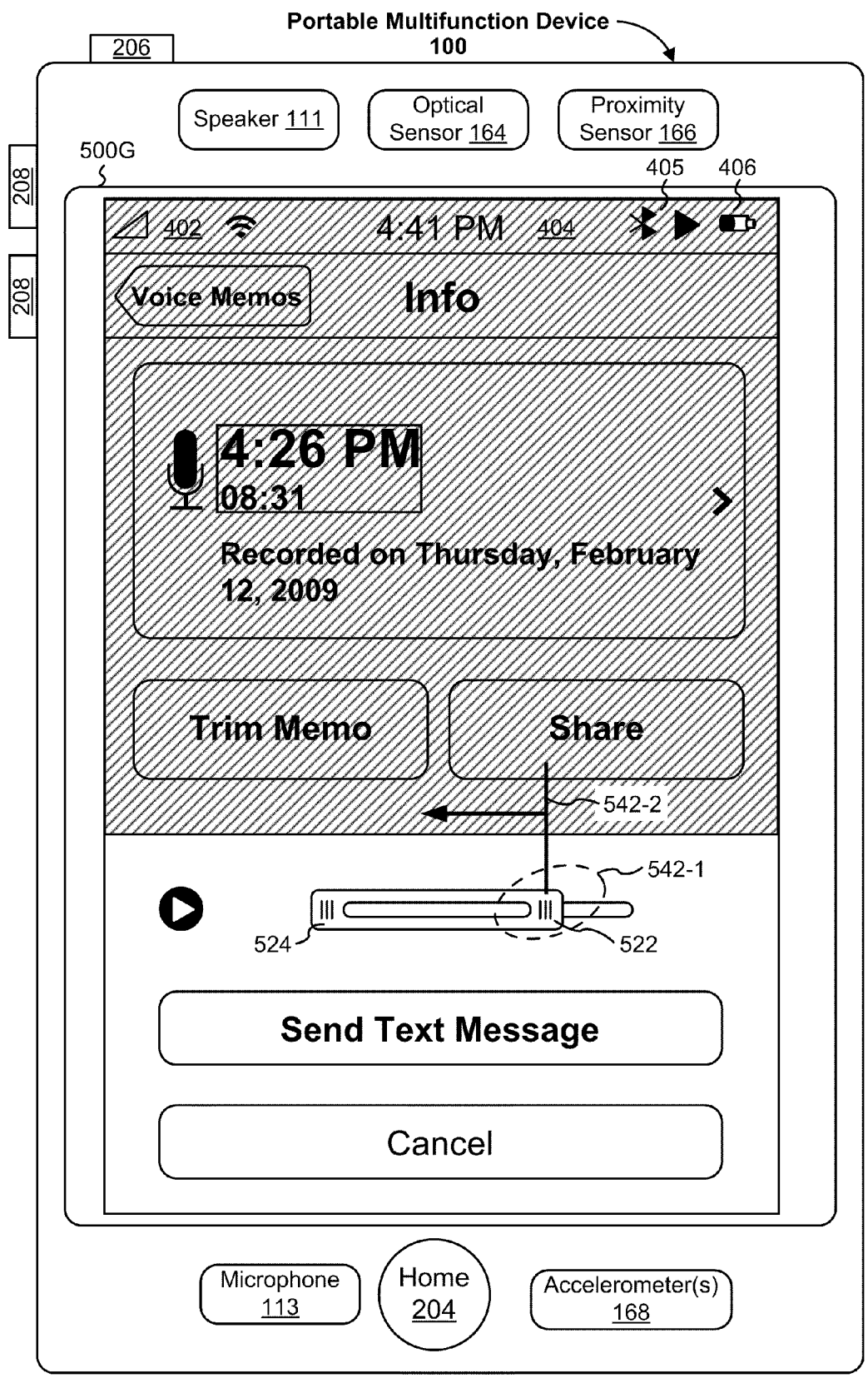
Figure 5H:
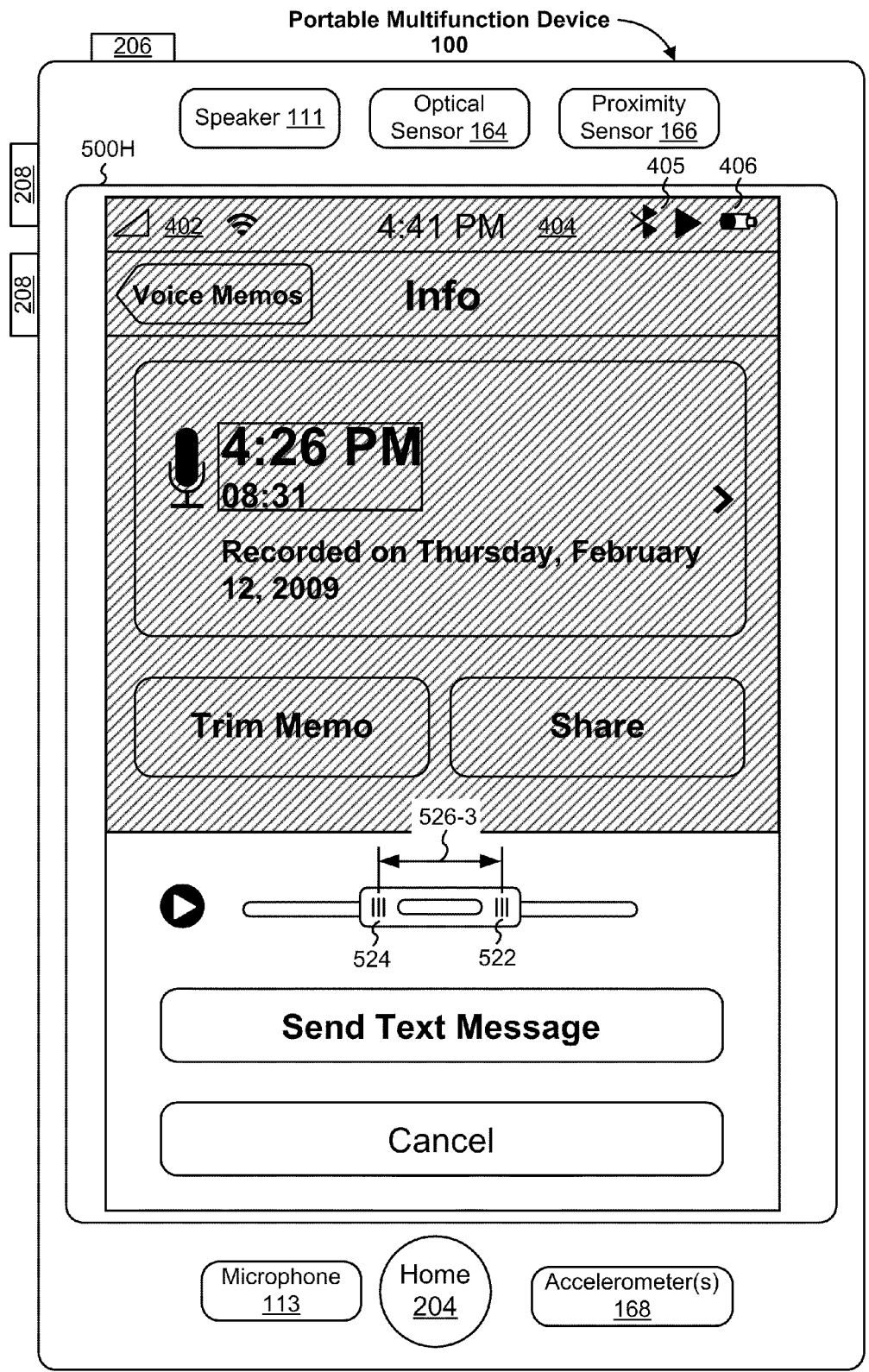
Figure 5I:
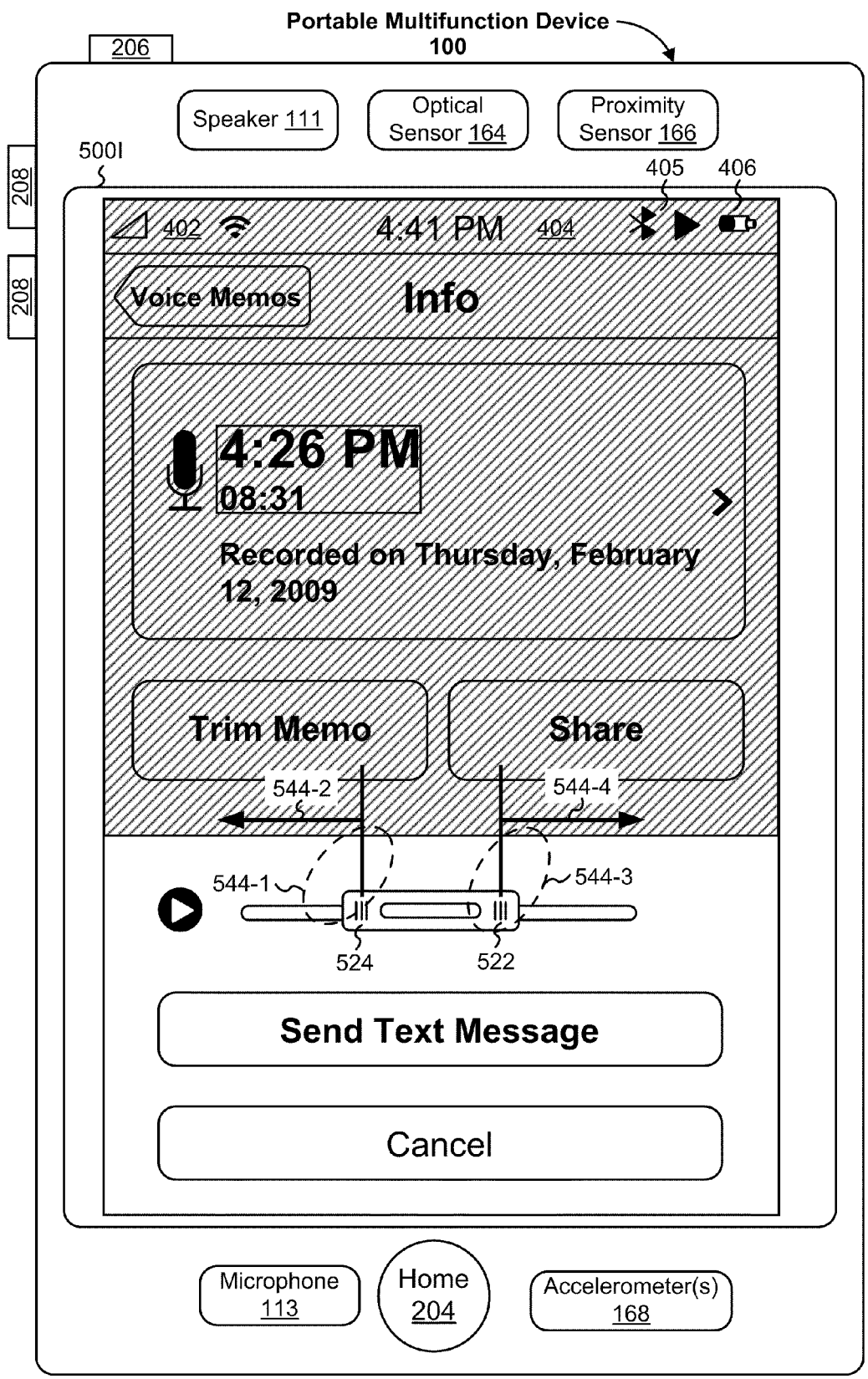
Figure 5J:
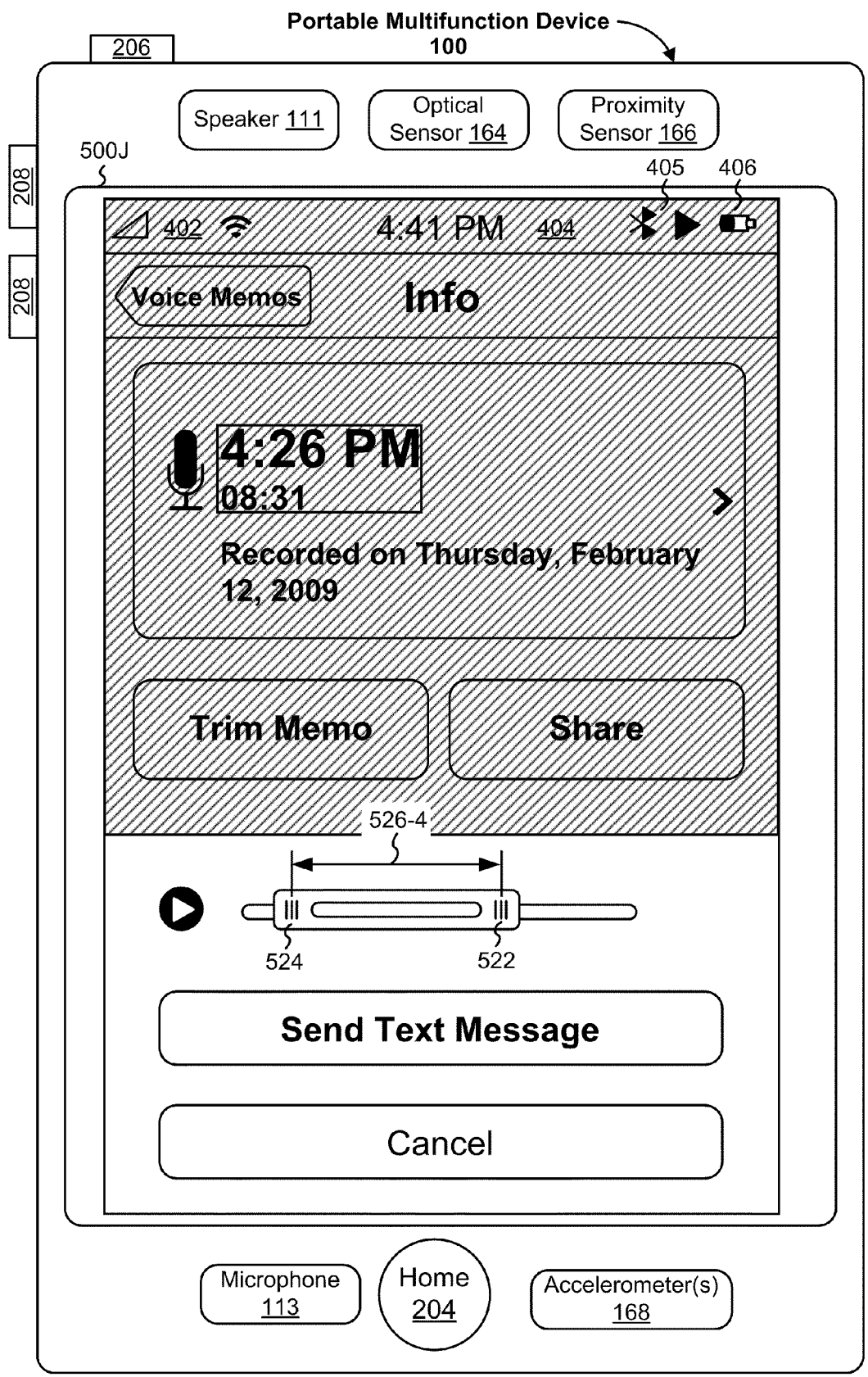
Figure 5K:
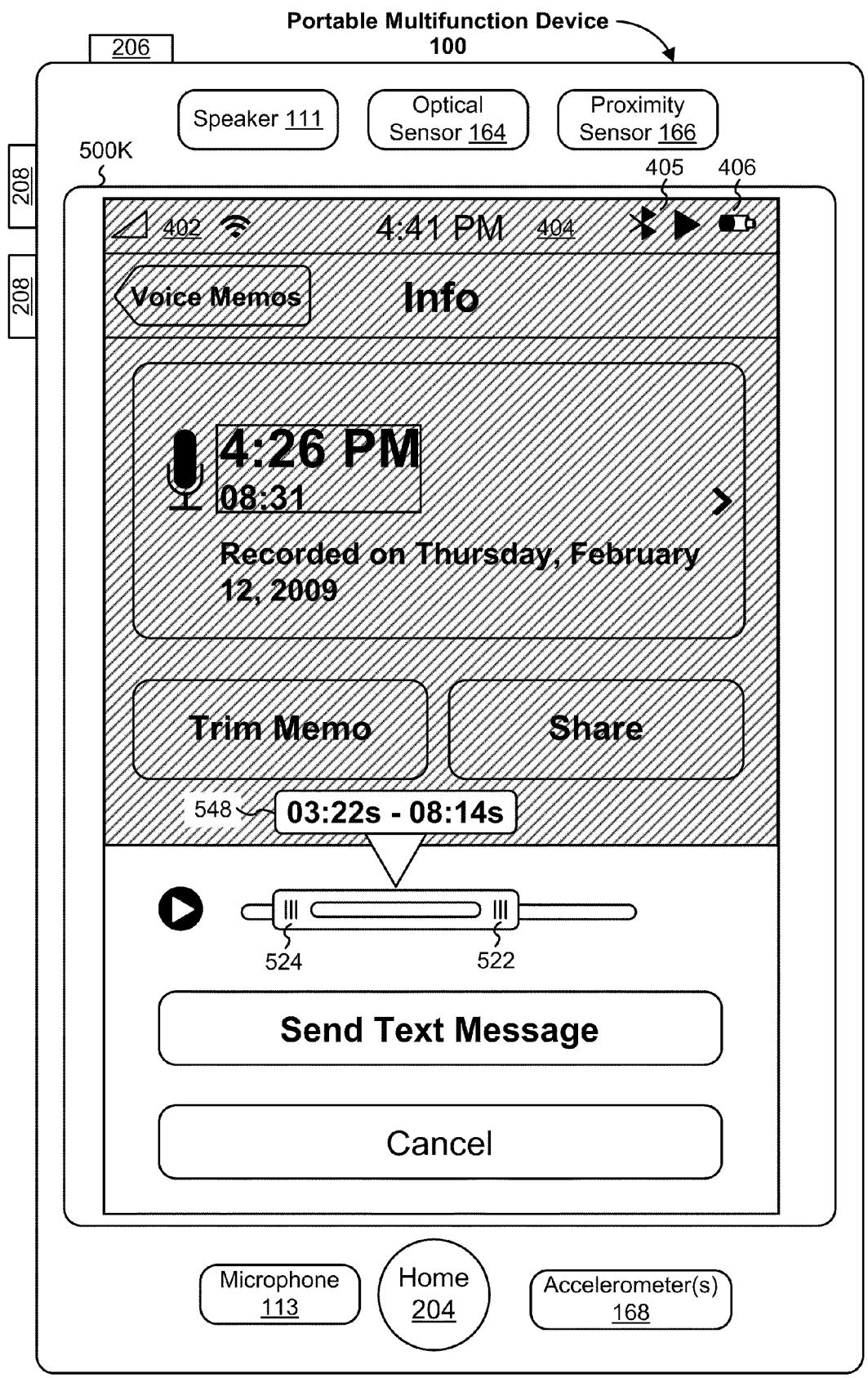
Figure 5L:
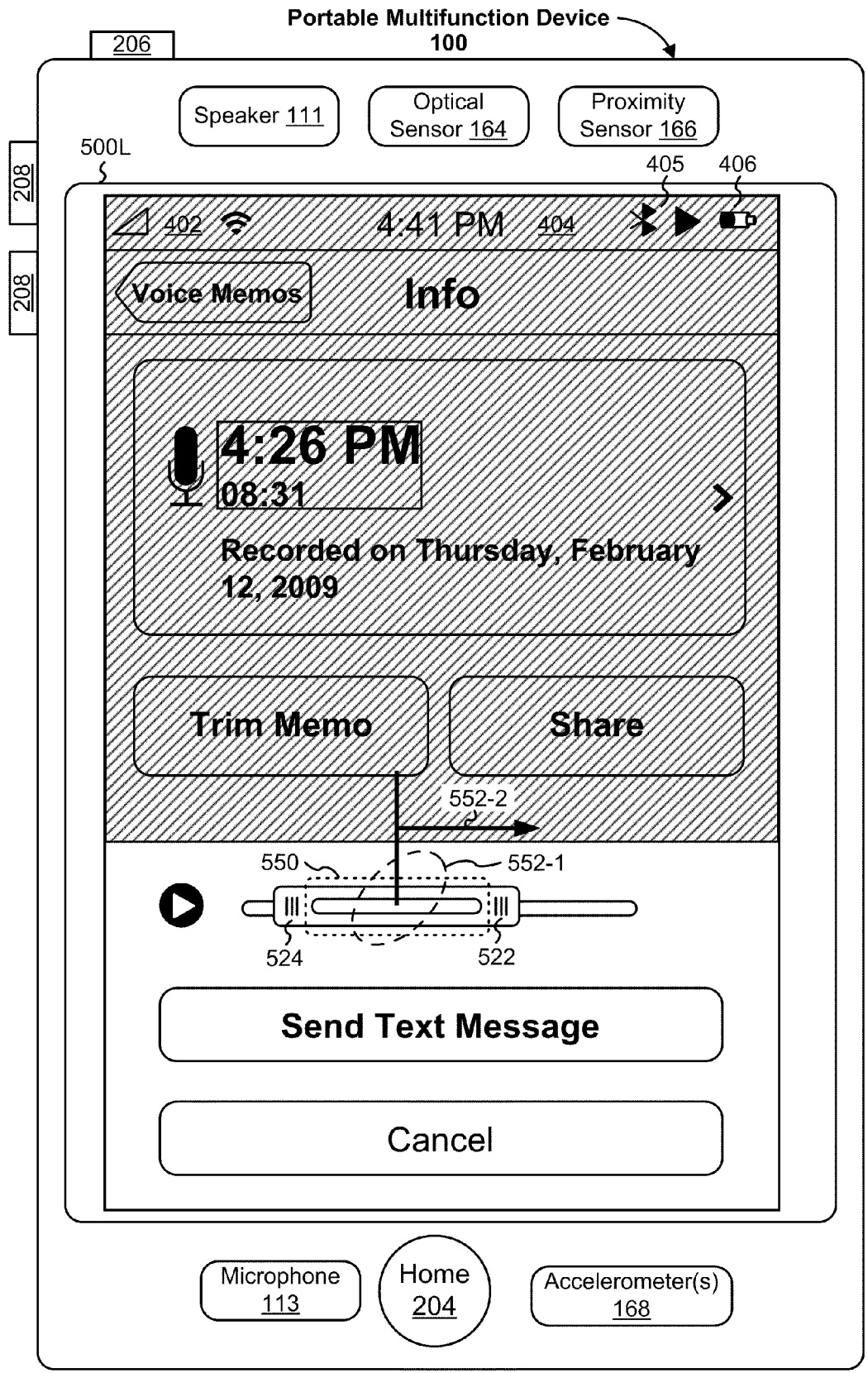
Figure 5M:
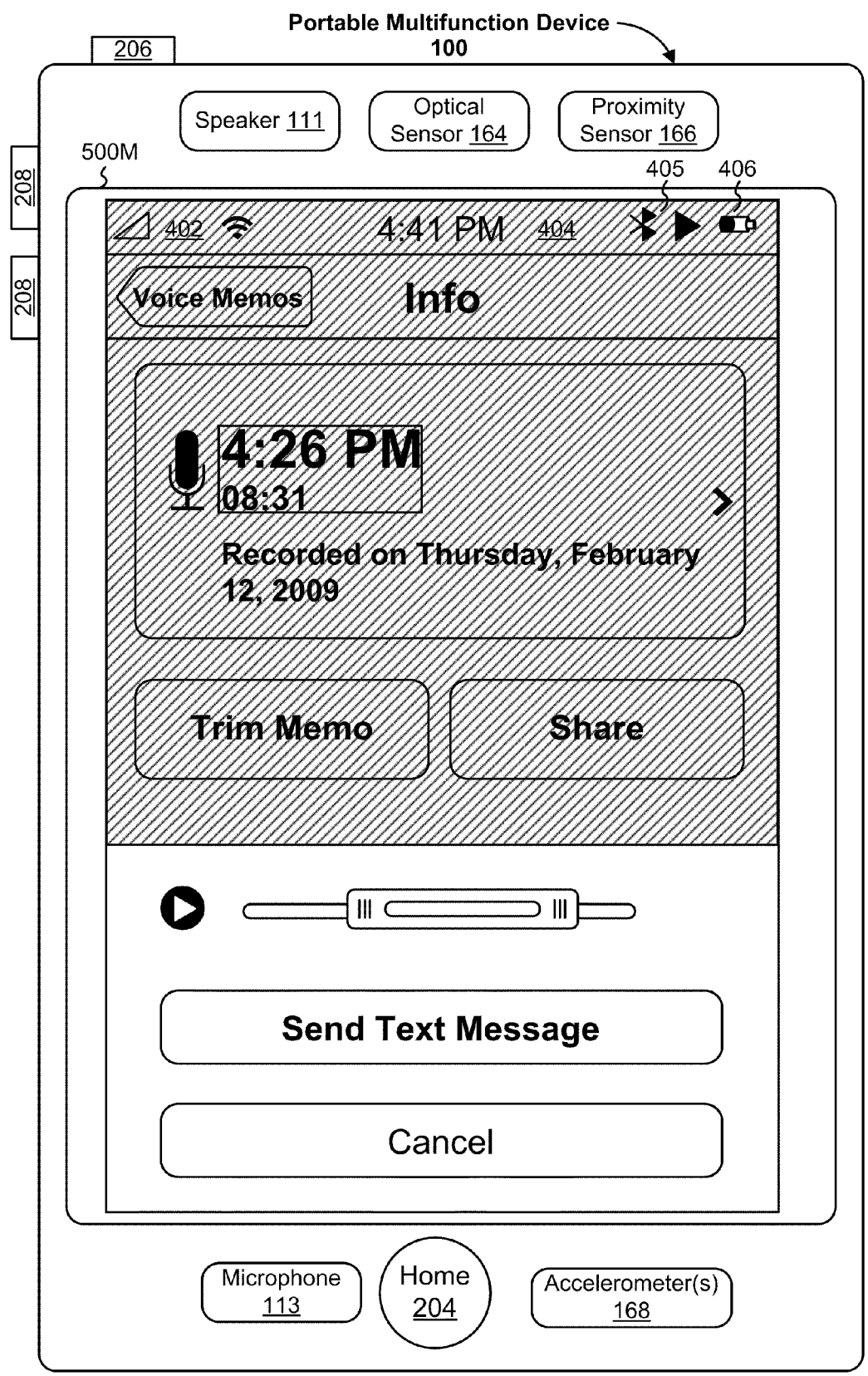
Figure 5N:
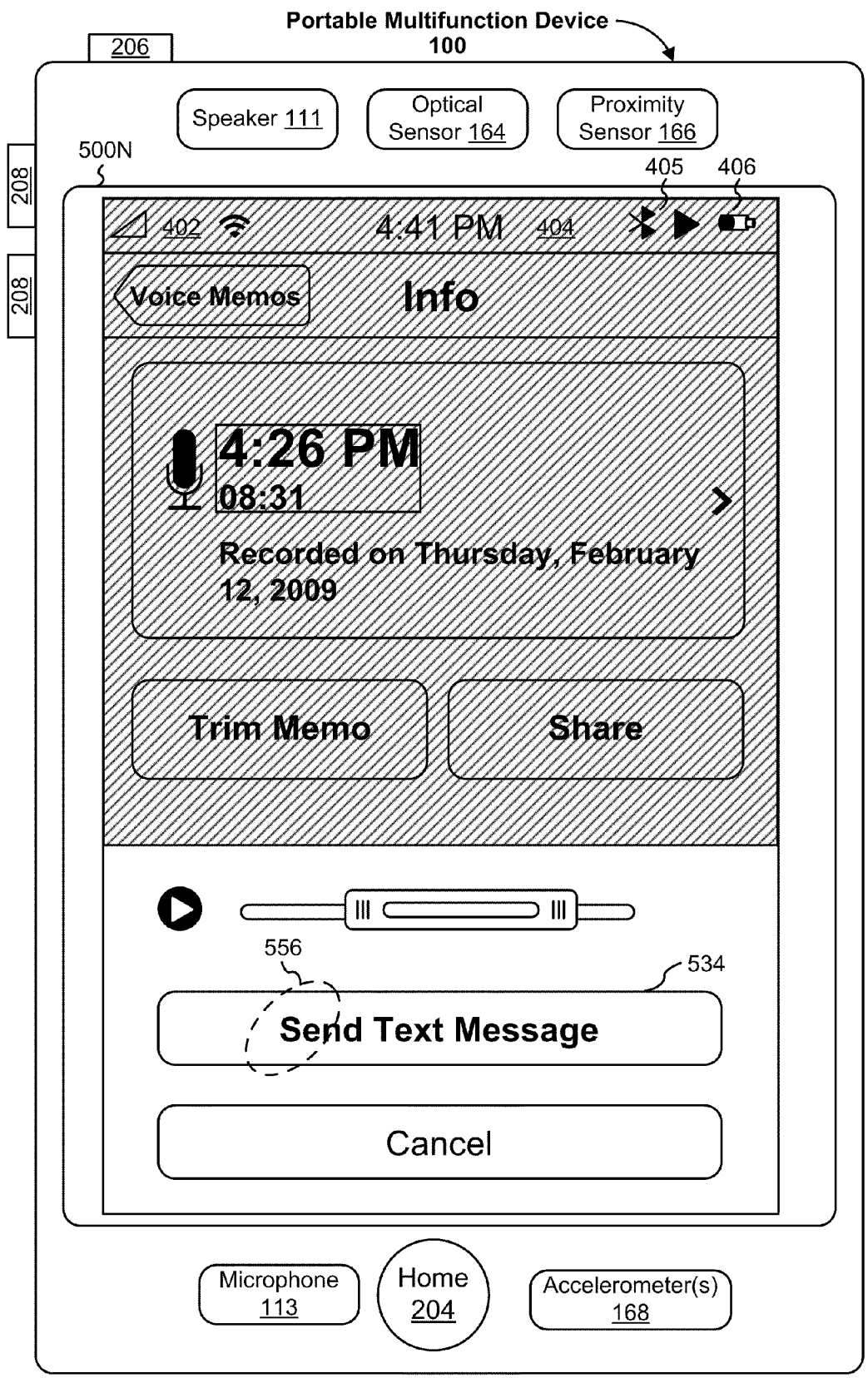
Figure 5O:
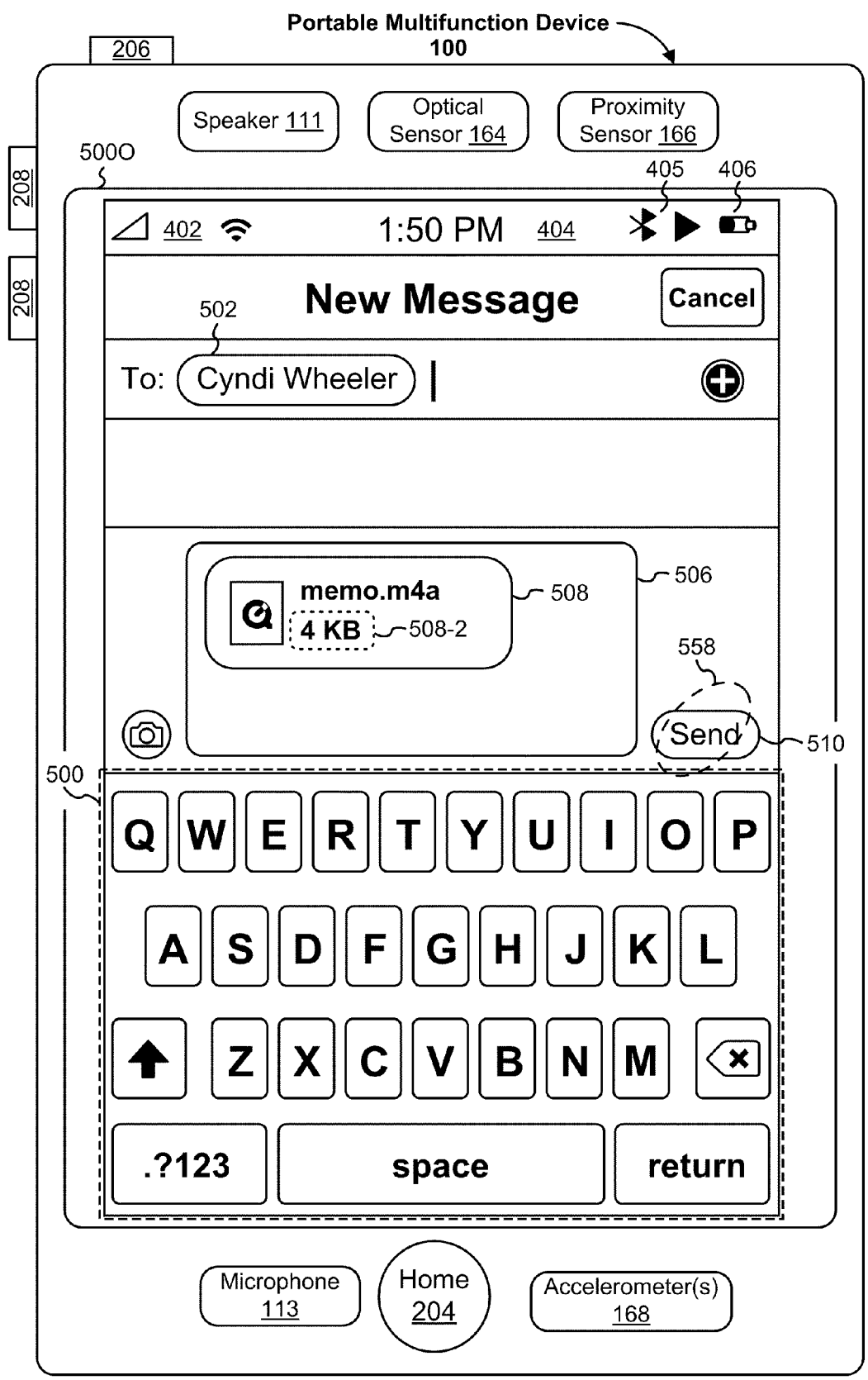
Figure 5P:
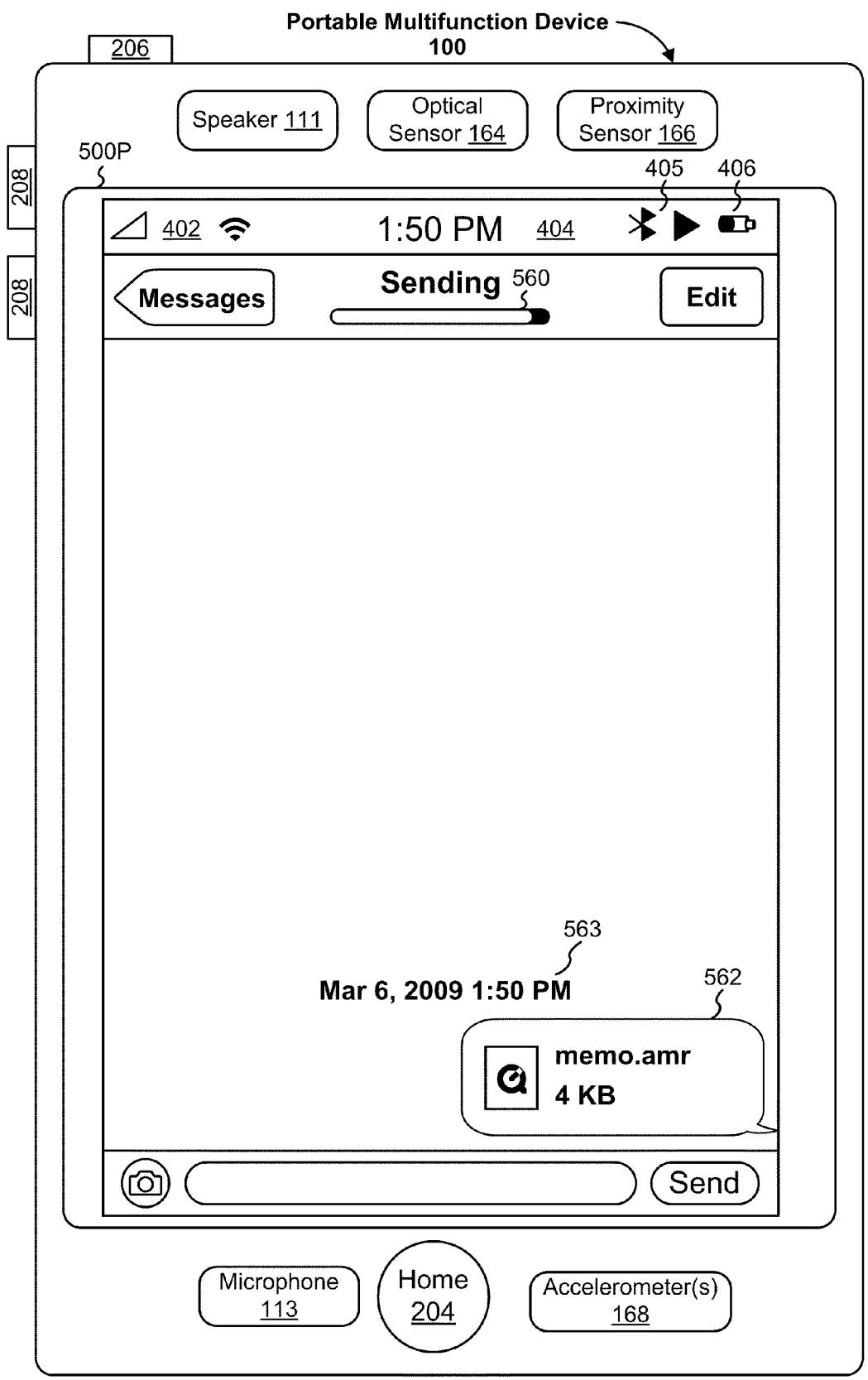
Figure 5Q:
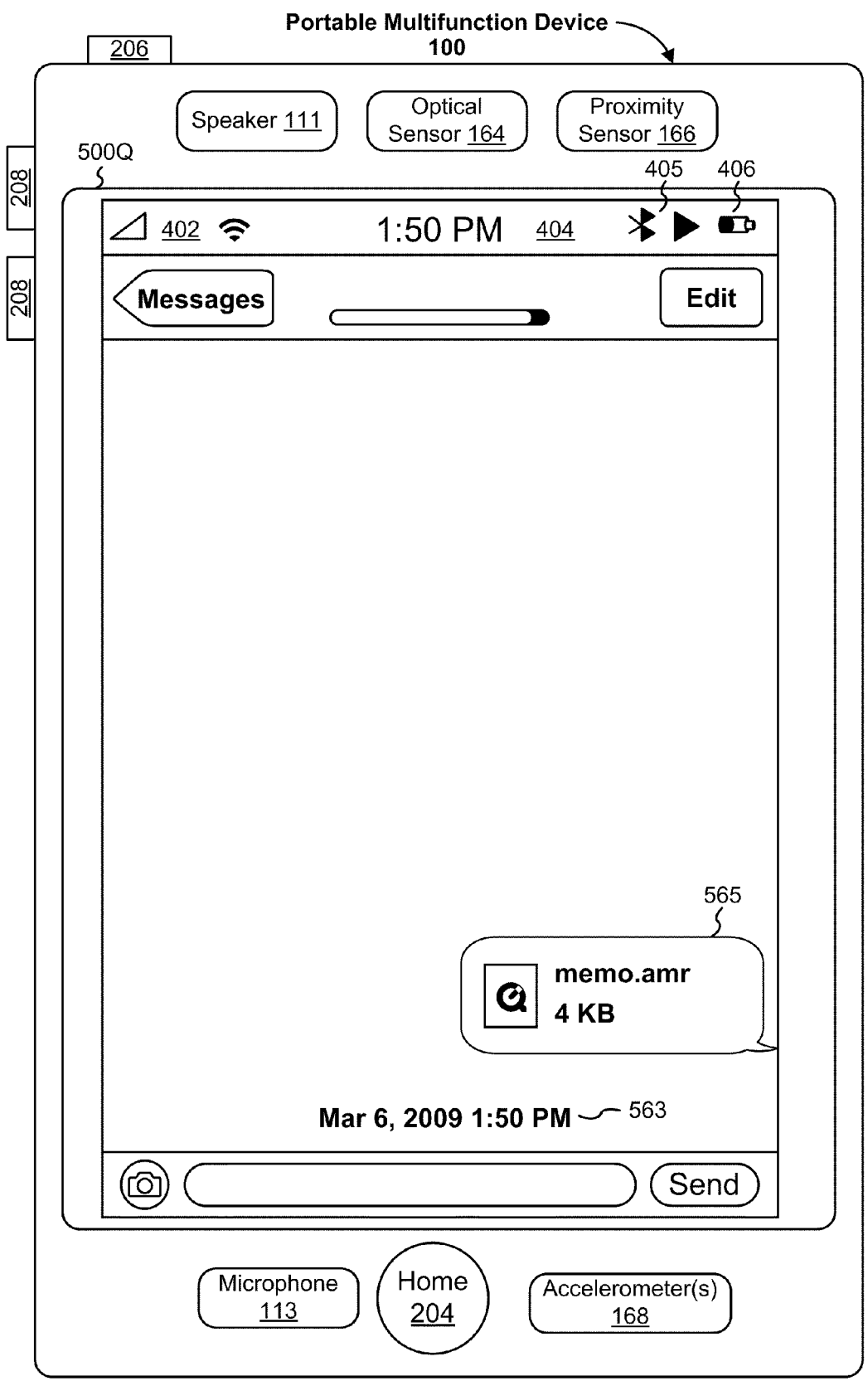
Figure 6A:
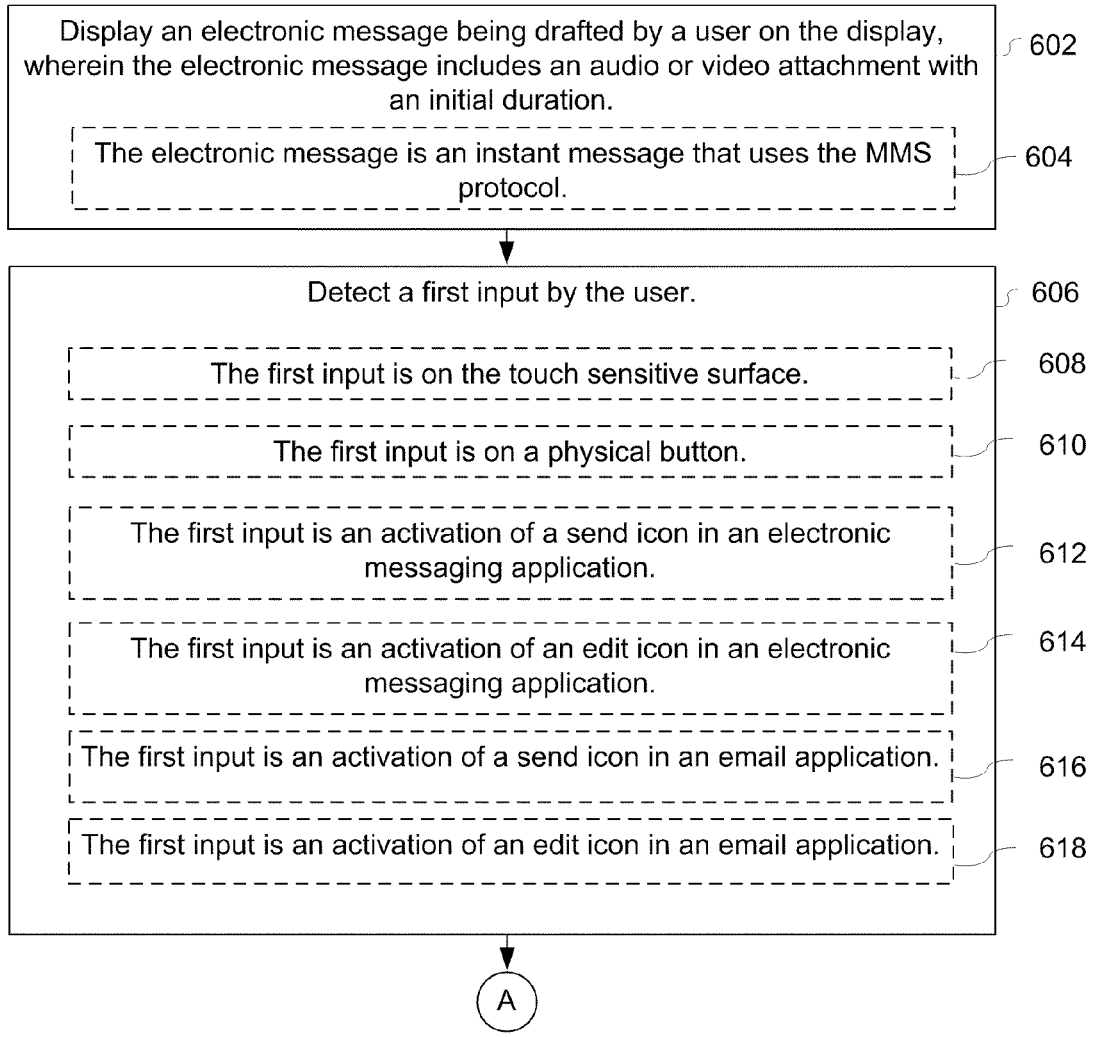
FIGS. 6A-6C are flow diagrams illustrating a method of editing an audio or video attachment to an electronic message in accordance with some embodiments.
Figure 6B:
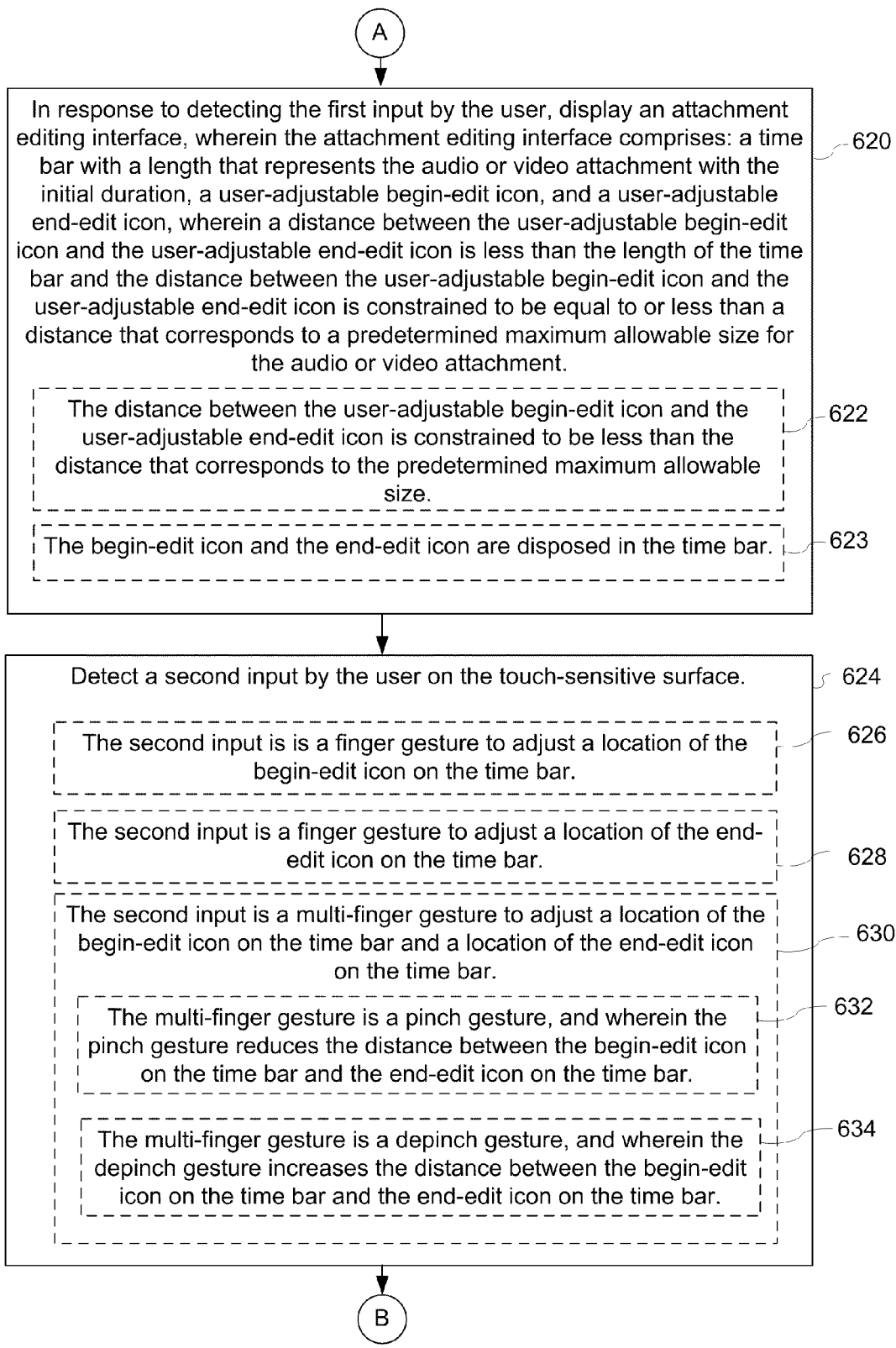
Figure 6C:
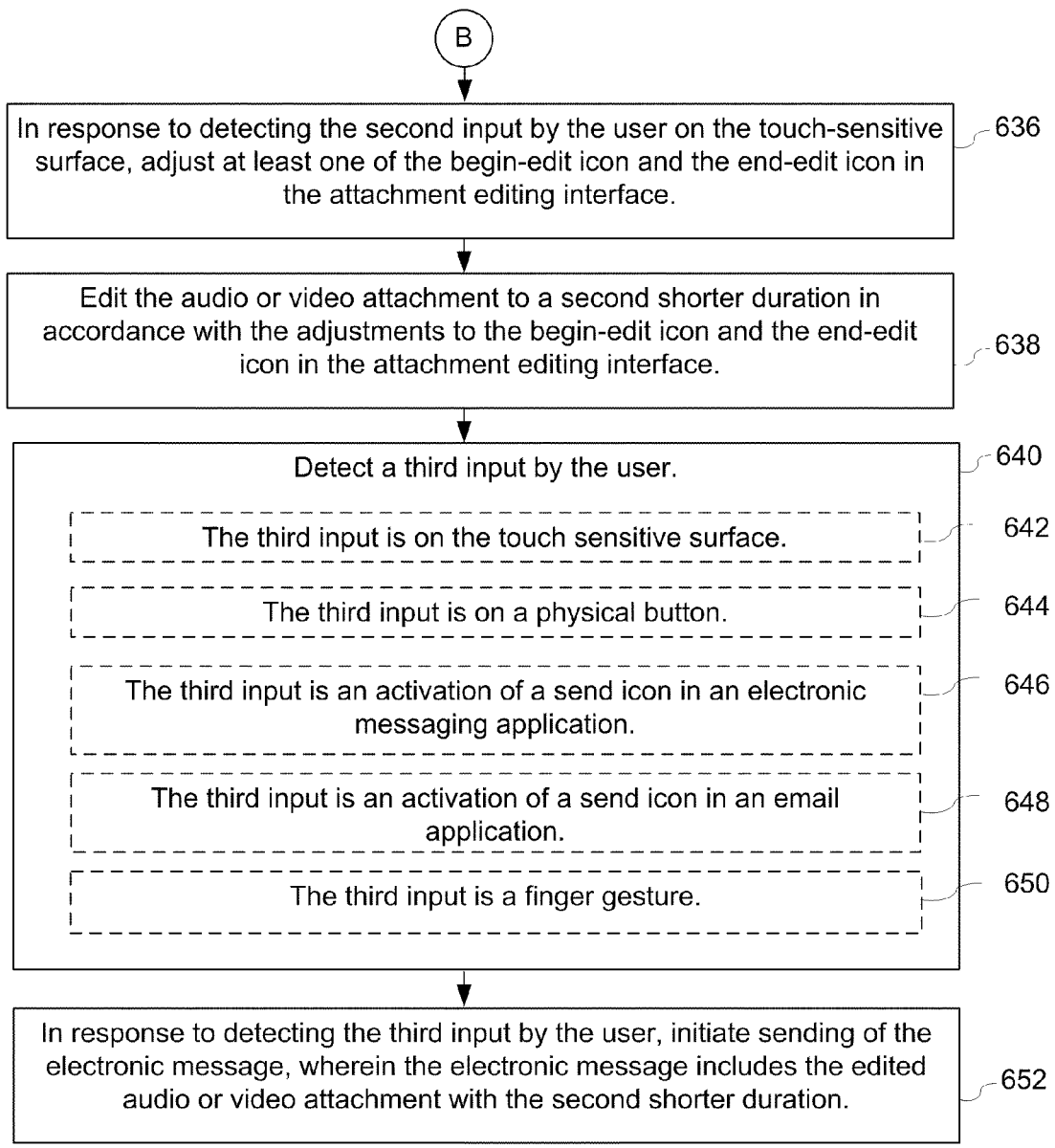

FIGS. 5A-5Q illustrate exemplary user interfaces for editing an audio or video attachment to an electronic message on a multifunction device with a display and a touch-sensitive surface in accordance with some embodiments. The user interfaces in these figures are used to illustrate the processes described below with respect to FIGS. 6A-6C.

UI 500A and UI 500B (FIGS. 5A and 5B, respectively) illustrate exemplary user interfaces for composing an electronic message that may include an audio or video attachment. Here, UI 500A illustrates a user drafting an electronic message. As depicted in this example, a soft keyboard 500 is provided to enable character input to address the electronic message. Electronic message recipients 502 may be displayed in addressee area 504. Attachment display area 506 may display one or more audio or video attachment 508 to the electronic message to be sent. In some embodiments, a send button 510 and a cancel button 512 are also provided. As depicted by 508-1, audio or video attachment 508 has an initial size. Here, the size is displayed as a file size. In some embodiments, the size may be displayed as a duration. An input 514 by the user may be detected, which allows the user to utilize the attachment editing module 133, through an attachment editing interface, such as that discussed with respect to UI 500C-UI 500O below.

UI 500C-UI 500O (FIGS. 5C through 5O) depict an exemplary attachment editing interface 518, which facilitates reducing the size of the audio or video attachment. The attachment editing interface 518 depicted here includes a time bar 520 with a length that represents the audio or video attachment's initial duration or size. The attachment editing interface 518 also includes a user-adjustable begin-edit icon 524 and a user-adjustable end-edit icon 522. These icons may be manipulated by a user to adjust the duration or size of the audio or video attachment 508. The user-adjustable begin-edit icon 524 and user-adjustable end-edit icon 522 are initially displayed at a distance 526-1. The distance 526 depicted in this example is less than the length of the time bar, and in some embodiments, the distance between the user-adjustable begin-edit icon 524 and the user-adjustable end-edit icon 522 may be constrained to be equal to or less than a distance that corresponds to a predefined maximum allowable duration or size. The exemplary attachment editing interface 518 depicted also includes an optional attachment info panel 528, which displays time recorded and duration information 528-1 and date recorded information 528-2. The exemplary attachment editing interface 518 depicted also includes an optional trim now button 530, which would reduce the size or duration of the attachment to correspond to the current settings of user-adjustable begin-edit icon 524 and user-adjustable end-edit icon 522.

The exemplary attachment editing interface 518 depicted also includes an optional share button 532, which when activated, would create another electronic message in which to send the attachment.

The exemplary attachment editing interface 518 depicted also includes an optional preview button 537, which would enable a user to listen to or view audio or video attachment 508 in the reduced size or duration corresponding to the current settings of user-adjustable begin-edit icon 524 and user-adjustable end-edit icon 522.

The exemplary attachment editing interface 518 depicted also includes a cancel button 536, as well as a send text message button 534, which, in coordination with the attachment editing module 133, would first reduce the size or duration of the attachment 508 to correspond to the current settings of user-adjustable begin-edit icon 524 and user-adjustable end-edit icon 522, and then return the user to the user interface for composing an and sending electronic message (e.g. UI 500A, UI 500O, etc.).

UI 500D (FIG. 5D) depicts a user input 538, which initially contacts 538-1 user-adjustable begin-edit icon 524, and as indicated by arrow 538-2, the user drags user-adjustable begin-edit icon 524 towards the right.

UI 500E (FIG. 5E) depicts the exemplary attachment editing interface 518 after user input 538 ends. This has the effect of reducing the distance 526-2 between user-adjustable begin-edit icon 524 and user-adjustable end-edit icon 522, and thus, the prospective size or duration of attachment 508 corresponds to the current shorter distance between user-adjustable begin-edit icon 524 and user-adjustable end-edit icon 522. As used herein, prospective size or duration means that, if trimmed without any further adjustments to user-adjustable begin-edit icon 524 and user-adjustable end-edit icon 522, the attachment editing module 133 would reduce the size or duration of the attachment 508 to correspond to the size or duration represented by the current settings of user-adjustable begin-edit icon 524 and user-adjustable end-edit icon 522.

UI 500F (FIG. 5F) depicts an exemplary edit-icon timing marker 540, which conveys to a user what time position within attachment 508 the user-adjustable begin-edit icon 524 is currently at. In some embodiments, edit-icon timing marker 540 may be animated to update the time position as a user adjusts either of user-adjustable begin-edit icon 524 and user-adjustable end-edit icon 522. In some embodiments, edit-icon timing marker 540 may be animated to appear once a user initiates contact with either of user-adjustable begin-edit icon 524 and user-adjustable end-edit icon 522. In some embodiments, edit-icon timing marker 540 may be animated to appear after a predetermined delay following a user's initiation of contact with either of user-adjustable begin-edit icon 524 and user-adjustable end-edit icon 522.

UI 500G (FIG. 5G) depicts a user input 542, which initially contacts 542-1 user-adjustable end-edit icon 522, and as indicated by arrow 542-2, the user drags user-adjustable end-edit icon 522 towards the left.

UI 500H (FIG. 5H) depicts the exemplary attachment editing interface 518 after the user terminates user input 542. This has the effect of reducing the distance 526-3 between user-adjustable begin-edit icon 524 and user-adjustable end-edit icon 522, and thus, the prospective size or duration of attachment 508 corresponds to the current shorter distance between user-adjustable begin-edit icon 524 and user-adjustable end-edit icon 522.

UI 500I (FIG. 5I) depicts a multi-touch user input 544, which: 1) initially contacts 544-1 user-adjustable begin-edit icon 524, and as indicated by arrow 544-2, the user drags user-adjustable begin-edit icon 524 towards the right; and 2) initially contacts 544-3 user-adjustable end-edit icon 522, and as indicated by arrow 544-4, the user drags user-adjustable end-edit icon 522 towards the left. This multi-touch user input 544 may be referred to as a depinch gesture, and it has the effect of increasing the distance between user-adjustable begin-edit icon 524 and user-adjustable end-edit icon 522. The initial contacts 544-1 and 544-3 may each be initiated with respect to each other within a predefined time period so as to avoid being confused with gestures other than depinch gestures.

UI 500J (FIG. 5J) illustrates that following the depinch gesture 544 depicted in FIG. 5I, the prospective size or duration of attachment 508 corresponds to the current larger distance 526-4 between user-adjustable begin-edit icon 524 and user-adjustable end-edit icon 522. Thus, depinch gestures can be used to increase the size or duration of an attachment in the attachment editing interface 518. Bear in mind, however, that the distance between the user-adjustable begin-edit icon 524 and the user-adjustable end-edit icon 522 is constrained to be equal to or less than a distance that corresponds to a predefined maximum allowable size.

UI 500K (FIG. 5K) depicts an exemplary edit-icon range marker 548, which conveys to a user what time range within attachment 508 the user-adjustable begin-edit icon 524 and user-adjustable end-edit icon 522 are currently set for. In some embodiments, edit-icon range marker 548 may be animated to update the time range as a user adjusts either of user-adjustable begin-edit icon 524 and user-adjustable end-edit icon 522. In some embodiments, edit-icon range marker 548 may be animated to appear once a user initiates contact with either of user-adjustable begin-edit icon 524 and user-adjustable end-edit icon 522. In some embodiments, edit-icon range marker 548 may be animated to appear after a predetermined delay following a user's initiation of contact with either of user-adjustable begin-edit icon 524 and user-adjustable end-edit icon 522.

UI 500L (FIG. 5L) depicts a user input 552, which initially contacts 552-1 the expanse 550 between user-adjustable begin-edit icon 524 and user-adjustable end-edit icon 522, and as indicated by arrow 552-2, the user drags the entire bar, including user-adjustable begin-edit icon 524, the expanse 550, and user-adjustable end-edit icon 522, towards the right. Alternatively, a user may drag the entire bar to the left as well. In some embodiments, edit-icon range marker 548 may be animated to update the time range as the user drags the entire bar as described here. In some embodiments, edit-icon range marker 548 may be animated to appear once the user starts dragging the entire bar as described here. In some embodiments, edit-icon range marker 548 may be animated to appear after a predetermined delay following a user's initiation of dragging the entire bar as described here.

UI 500M (FIG. 5M) depicts the location of the range within the attachment 508 that attachment editing module 133 will retain following editing.

UI 500N (FIG. 5N) depicts a user input 556 on send text message button 534, indicating that the attachment editing module 133 should proceed to edit the audio or video attachment 508 to the shorter size or duration that corresponds to the then existing settings for the begin-edit icon 524 and the end-edit icon 522 in the attachment editing interface 518.

UI 500O (FIG. 5O) depicts the return from the exemplary attachment editing interface 518 to the exemplary user interface for composing an electronic message. Following the attachment editing module 133's edit operation on attachment 508, it may be noted that the size 508-2 of the attachment is now smaller than it was in UI 500A. Assuming that no additional changes to the electronic message are desired, the user may send the message. User input 558 on send button 510 initiates sending of the electronic message.

UI 500P (FIG. 5P) depicts an exemplary electronic messaging interface in a send state, indicated by sending indicia 560, as well as message blurb 562 which is below date and time status marker 563.

UI 500Q (FIG. 5Q) depicts the exemplary electronic messaging interface after sending the electronic message. Sent message blurb 565 is now above date and time status marker 563, and sending indicia 560 has been removed from the user interface UI 500Q.

FIGS. 6A-6E are flow diagrams illustrating a method of editing an audio or video attachment to an electronic message in accordance with some embodiments. The method 600 is performed at a multifunction device (e.g., 300, FIG. 3) with a display and a touch-sensitive surface. In some embodiments, the display is a touch screen. In some embodiments, the touch-sensitive surface is a touchpad.

Some operations in method 600 may be combined and/or the order of some operations may be changed.

The device displays (602) an electronic message being drafted by a user on the display, wherein the electronic message includes an audio (e.g., a digitally stored audio recording of lectures, dictation, telephone calls, conversations, performances, etc.) or video (e.g., a digitally stored video recording of any lecture, meeting, performance, concerts, etc.) attachment with an initial duration. The electronic message may be an instant message or an email which includes the audio attachment or a video attachment with an initial duration.

In some embodiments, the electronic message is an instant message that uses the MMS protocol (604).

The device detects (606) a first input by the user (e.g., input 514, FIG. 5B). In some embodiments, the first input is on the touch sensitive surface (608). In some embodiments, the first input is on a physical button (610). In some embodiments, the first input is an activation of a send icon in an electronic messaging application (612). In some embodiments, the first input is an activation of an edit icon in an electronic messaging application (614). In some embodiments, the first input is an activation of a send icon in an email application (616). Alternatively, the first input is an activation of an edit icon in an email application (618).

In response to detecting the first input by the user, the device displays (620) an attachment editing interface (e.g., attachment editing interface 518, FIG. 5C). The attachment editing interface is configured to allow a user to indicate the portion(s) of the audio or video attachment that the attachment editing module 133 should trim, so that the audio or video attachment is reduced from its initial duration to a second, shorter duration. The attachment editing interface comprises a number of features, which are described as follows. The attachment editing interface includes a time bar with a length that represents the audio or video attachment with the initial duration (e.g. time bar 520 FIG. 5C). The attachment editing interface also includes a user-adjustable begin-edit icon (e.g. 524 FIG. 5C). The user-adjustable begin-edit icon indicates a start point for the audio or video attachment after editing. The attachment editing interface also includes a user-adjustable end-edit icon (e.g. 522 FIG. 5C). The user-adjustable end-edit icon indicates an end point for the audio or video attachment after editing. The attachment editing interface is configured so that a distance (e.g. 526-1 FIG. 5C) between the user-adjustable begin-edit icon and the user-adjustable end-edit icon is less than the length of the time bar. The attachment editing interface is also configured so that the distance between the user-adjustable begin-edit icon and the user-adjustable end-edit icon is constrained to be equal to or less than a distance that corresponds to a predefined maximum allowable size, or in some embodiments, a maximum allowable duration, for the audio or video attachment.

Further, in some embodiments, the distance between the user-adjustable begin-edit icon and the user-adjustable end-edit icon is constrained to be less than the distance that corresponds to the predefined maximum allowable size (622).

In some embodiments, the begin-edit icon and the end-edit icon are disposed in the time bar (623).

The device detects (624) a second input by the user on the touch-sensitive surface (e.g., 538 in FIG. 5D, 542 in FIG. 5G, 544 in FIG. 5I, 552 in FIG. 5L, or 744 in FIG. 7E, discussed below). In some embodiments, the second input is a finger gesture to adjust a location of the begin-edit icon on the time bar (626). In some embodiments, the second input is a finger gesture to adjust a location of the end-edit icon on the time bar (628).

In some embodiments, the second input is a multi-finger gesture to adjust a location of the begin-edit icon on the time bar and/or a location of the end-edit icon on the time bar (630) (e.g. 538 in FIG. 5D, 542 in FIG. 5G, 552 in FIG. 5L). In some embodiments, the multi-finger gesture is a pinch gesture, and wherein the pinch gesture reduces the distance between the begin-edit icon on the time bar and the end-edit icon on the time bar (632) (e.g. 744 in FIG. 7E, discussed below). In some embodiments, the multi-finger gesture is a depinch gesture, and wherein the depinch gesture increases the distance between the begin-edit icon on the time bar and the end-edit icon on the time bar (634) (e.g. FIG. 544 in FIG. 5I).

In response to detecting the second input by the user on the touch-sensitive surface, the device adjusts (636) at least one of the begin-edit icon and the end-edit icon in the attachment editing interface. In some embodiments, the adjustment includes adjusting a location of at least one of the begin-edit icon and the end-edit icon in the attachment editing interface while maintaining the constraint that the distance between the user-adjustable begin-edit icon and the user-adjustable end-edit icon is equal to or less than the distance that corresponds to the predefined maximum allowable size for the audio or video attachment.

The device edits (638) the audio or video attachment to a second shorter duration in accordance with the adjustments to the begin-edit icon and the end-edit icon in the attachment editing interface. The device also detects (640) a third input by the user (e.g. 556 in FIG. 5N). In some embodiments, the editing (638) may be performed by attachment editing module 133 before detecting the third input, while alternatively, the editing (638) may be performed by attachment editing module 133 after detecting the third input.

In some embodiments, the third input is on the touch sensitive surface (642). In some embodiments, the third input is on a physical button (644). In some embodiments, the third input is an activation of a send icon in an electronic messaging application (646) (e.g. user input 558 on send button 510 in FIG. 5O). In some embodiments, the third input is an activation of a send icon in an email application (648). In some embodiments, the third input is a finger gesture (650).

In response to detecting the third input by the user, The device initiates sending (652) of the electronic message, wherein the electronic message includes the edited audio or video attachment with the second shorter duration.

FIGS. 7A-7J illustrate exemplary user interfaces for editing an audio or video file for sending in an electronic message in accordance with some embodiments. The user interfaces in these figures are used to illustrate the processes described below with respect to FIGS. 8A-8B.

UI 700A (FIG. 7A) depicts an exemplary user interface 700 for managing audio or video attachments, and includes a scrollable list 702 of audio or video files that may be sent as an electronic message, or in some embodiments, as an attachment to an electronic message. In this example, audio or video files 702-1 and 702-2 are in scrollable list 702, and additional places in scrollable list 702 (e.g., 702-3) may represent additional audio or video files as they are created or received.

Info button 704 may, in some embodiments, provide an information display about the audio or video file, which may take the form of attachment info panel 528 as discussed above with respect to UI 500C. Toggle play/pause button 706 may allow a user to review the contents of an audio or video file, and in some embodiments, play status bar 708 may indicate progress of the user's review by advancing the play time towards completion as the file is reviewed.

Delete button 710 allows a user to remove a selected audio or video file. Share button 711 allows a user to send an audio or video file selected in exemplary user interface 700 as an electronic message or an attachment to an electronic message. Activation of share button 711 here is depicted by user selection 712, which allows exemplary user interface 700 to prepare to send selected audio or video file 702-1.

UI 700B depicts that in some embodiments, file size warning 714 may be displayed if the selected audio or video file 702-1 is larger than a predefined maximum allowable size for the audio or video file (which in this example is true). File size warning 714 includes a close button 716, which if activated, cancels sending of the selected audio or video file 702-1 and returns the user to UI 700A. File size warning 714 includes a file editing interface activation button 718, which if activated, places the selected audio or video file 702-1 in an audio or video file editing interface, an exemplary version of which is depicted in UI 700C-UI 700G. In some embodiments, the audio or video file editing interface of UI 700C-UI 700G may be similar to the exemplary attachment editing interface 518 discussed above with reference to UI 500C-UI 500O (FIGS. 5C through 5O). Here, user input 719 activates an audio or video file editing interface.

UI 700C-UI 700G (FIGS. 7C-7G) depicts an exemplary audio or video file editing interface 720, which in this example is the same as exemplary attachment editing interface 518 shown in UI 500C-UI 500O, and operates in the same fashion as discussed above. Accordingly, a shortened overview of the editing operations will be provided.

UI 700D (FIG. 7D) depicts an editing operation like that depicted in UI 500D, where a user input 726 which initially contacts 726-1 user-adjustable begin-edit icon 724, and as indicated by arrow 726-2, the user drags user-adjustable begin-edit icon 724 towards the right, adjusting the prospective size or duration of selected audio or video file 702-1.

UI 700E-UI 700F (FIGS. 7E-7F) depicts a multi-touch user input 744, which: 1) initially contacts 744-1 user-adjustable begin-edit icon 724, and as indicated by arrow 744-2, the user drags user-adjustable begin-edit icon 724 towards the left; and 2) initially contacts 744-3 user-adjustable end-edit icon 722, and as indicated by arrow 744-4, the user drags user-adjustable end-edit icon 722 towards the right. This multi-touch user input 744 may be referred to as a pinch gesture (the opposite of the depinch gesture shown in UI 500I), and it has the effect of decreasing the distance between user-adjustable begin-edit icon 724 and user-adjustable end-edit icon 722. As depicted in UI 700F, following the pinch gesture 744 depicted in FIG. 7E, the prospective size or duration of selected audio or video file 702-1 corresponds to the current smaller distance 750 between user-adjustable begin-edit icon 724 and user-adjustable end-edit icon 722. As with depinch gestures as discussed above, the initial contacts 744-1 and 744-3 may each be initiated with respect to each other within a predefined time period so as to avoid being confused with gestures other than pinch gestures.

UI 700G (FIG. 7G) depicts a user input 754 on send text message button 752, indicating that the attachment editing module 133 should proceed to edit the selected audio or video file 702-1 to the shorter size or duration corresponding to the then existing settings for the begin-edit icon 724 and the end-edit icon 722.

The activation of send text message button 752 will cause the user interface 700 for managing audio or video attachments to have the attachment editing module 133 edit the selected audio or video file 702-1 to a second, shorter duration or size corresponding to the then existing settings for the begin-edit icon 724 and the end-edit icon 722.

In some embodiments, the audio or video file 702-1 with the second shorter duration or size would then be sent to a predetermined location (e.g., a file server, a web-based file repository, a FTP site, a predefined email address, etc). In some embodiments, the audio or video file 702-1 with the second shorter duration or size would then be placed in an electronic message as an attachment.

UI 700H-UI 700J (FIGS. 7H-7J) depicts the process of sending an attachment (here, audio or video file 702-1 with the second shorter duration or size) in an electronic message; the exemplary process of sending the electronic message in UI 700H-UI 700J is the same as the process depicted in UI 500O-UI 500Q, and will not be described in detail here.

Figure 8A:
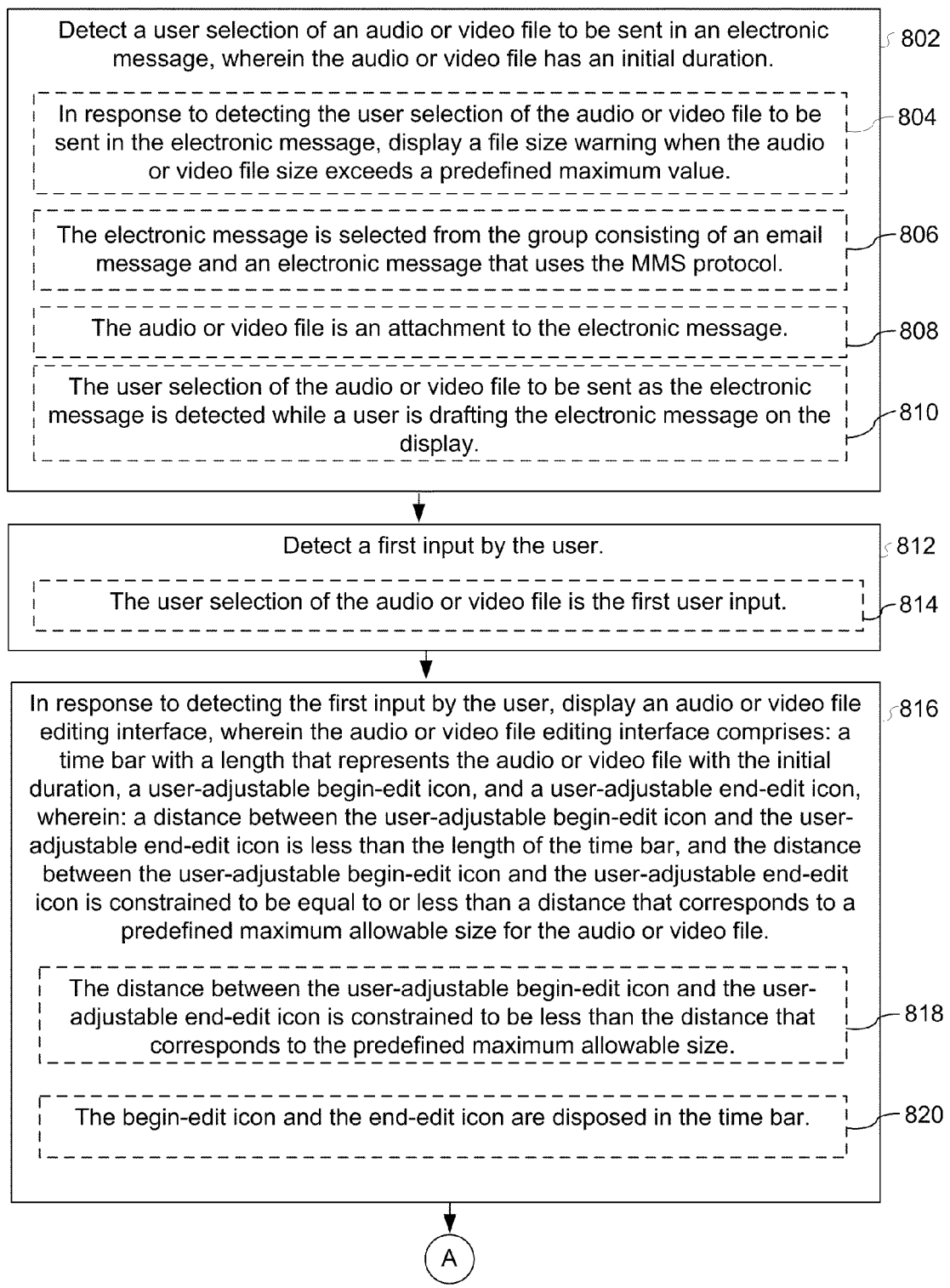
FIGS. 8A-8B are flow diagrams illustrating a method of editing audio or video files as electronic messages in accordance with some embodiments.
Figure 8B:
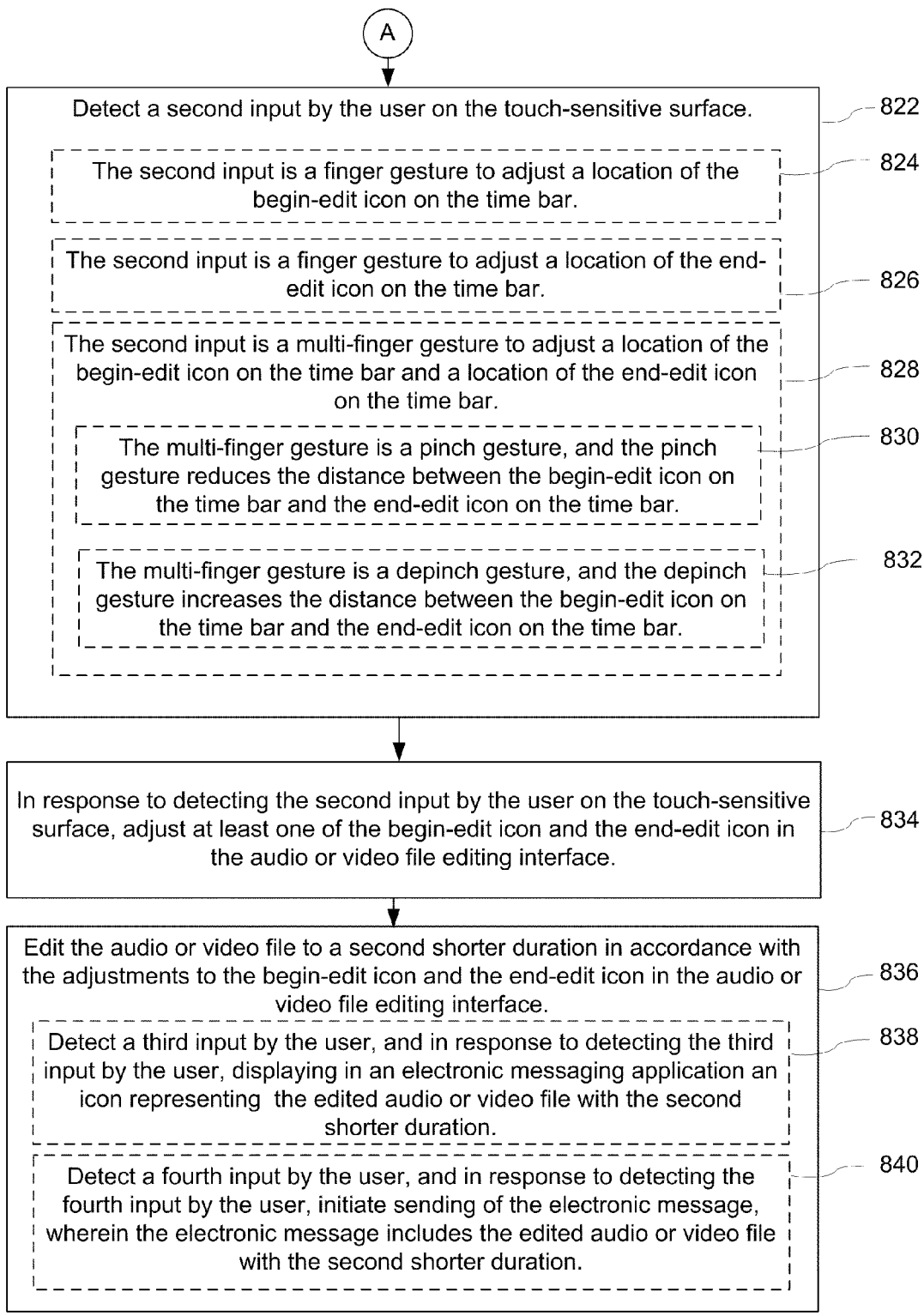

FIGS. 8A-8B are flow diagrams illustrating a method of editing an audio or video attachment to an electronic message in accordance with some embodiments. The method 800 is performed at a multifunction device (e.g., 300, FIG. 3) with a display and a touch-sensitive surface.

Some operations in method 800 may be combined and/or the order of some operations may be changed.

The device detects (802) a user selection (e.g. user selection 712 of FIG. 7A) of an audio or video file to be sent in an electronic message, wherein the audio or video file has an initial duration. The user selection may be any form of appropriate input (e.g., a finger gesture such as a tap gesture on share button 711, FIG. 7A).

Figure 7A:
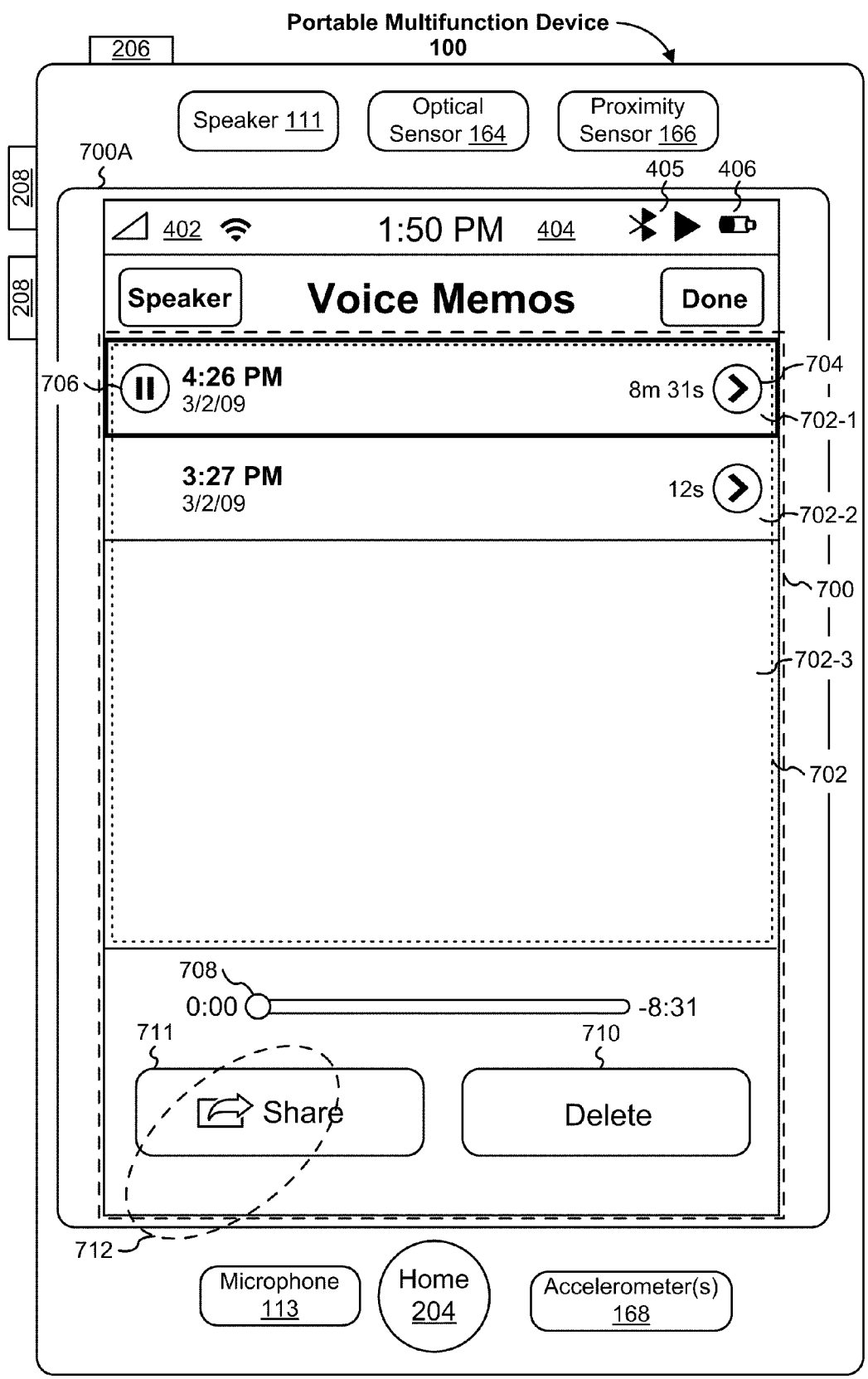
FIGS. 7A-7J illustrate exemplary user interfaces for editing audio or video files for sending in an electronic message in accordance with some embodiments.
Figure 7B:
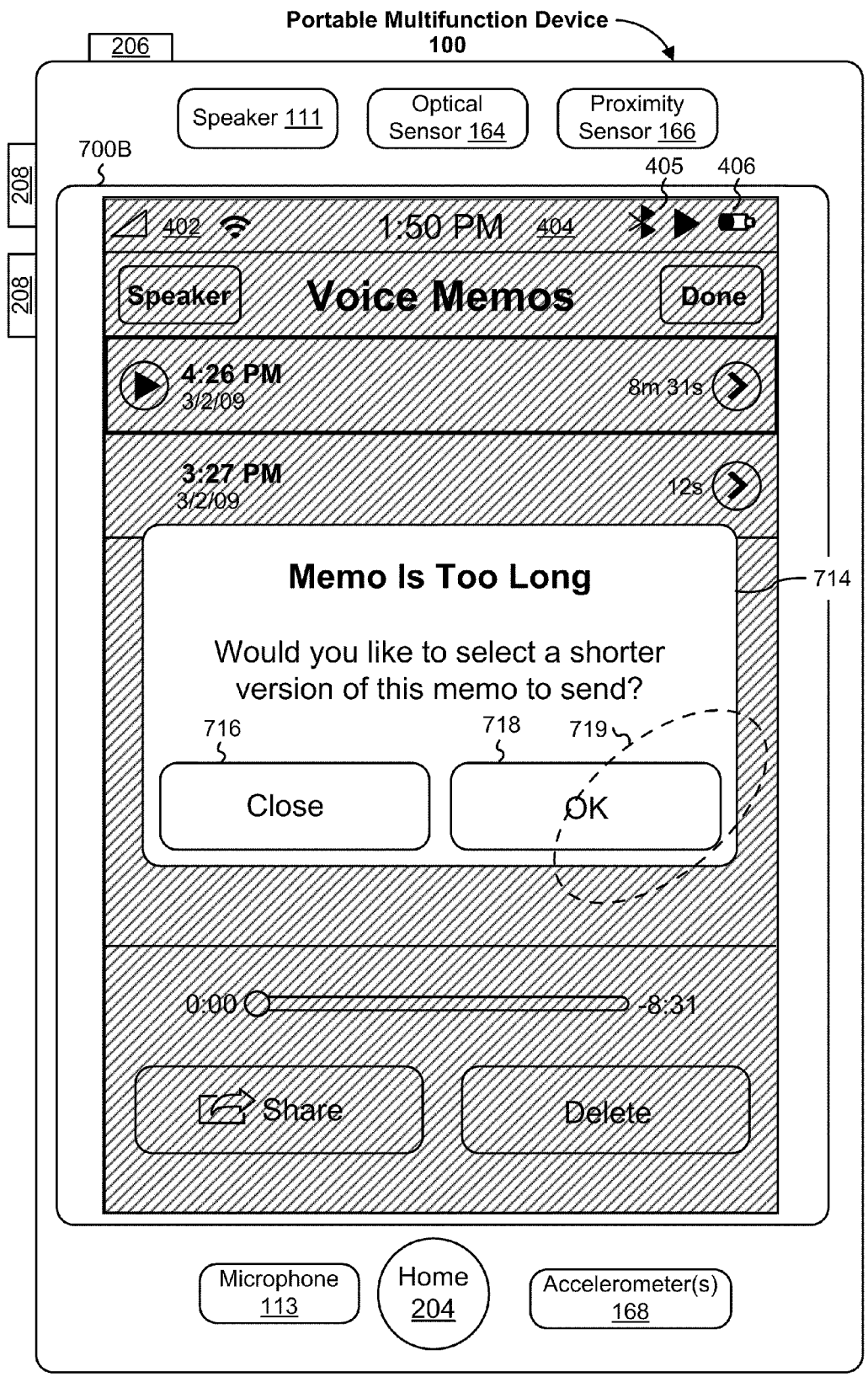
Figure 7C:
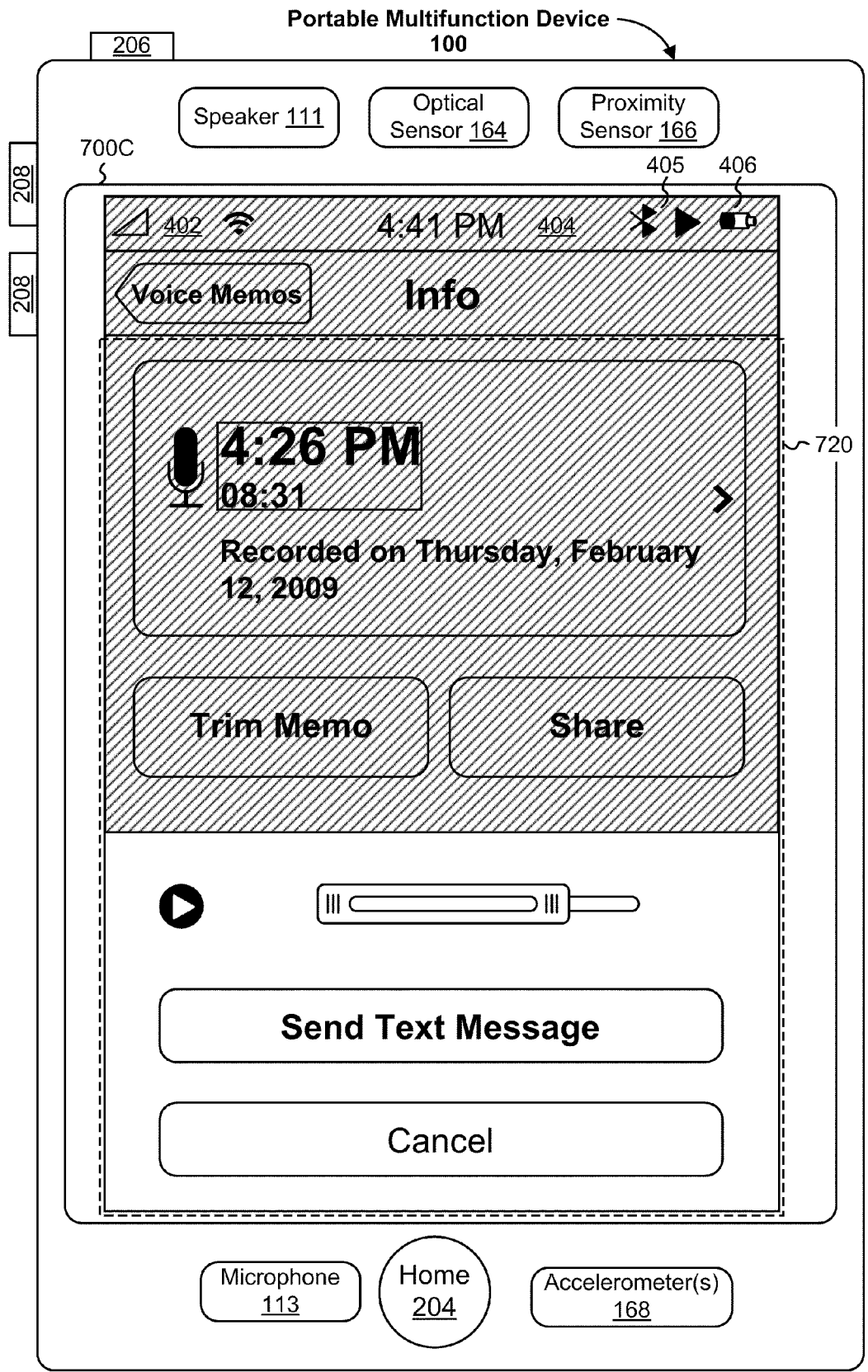

In some embodiments, in response to detecting the user selection of the audio or video file to be sent in the electronic message, The device may display (804) a file size warning when the audio or video file size exceeds a predefined maximum value (e.g., file size warning 714 in FIG. 7B).

In some embodiments, the electronic message is selected from the group consisting of an email message and an electronic message that uses the MMS protocol (806). In some embodiments, the audio or video file is an attachment to the electronic message (808). In some embodiments, the user selection of the audio or video file to be sent as the electronic message is detected while a user is drafting the electronic message on the display (810).

After detecting the user selection of the audio or video file to be sent in the electronic message, The device detects (812) a first input by the user (e.g., a finger gesture such as a tap gesture on file editing interface activation button 718 in file size warning 714, FIG. 7B).

In some embodiments, the user selection of the audio or video file is the first user input (814). For example, in some embodiments, a file editing interface may be displayed in response to the user selecting an electronic message type icon (not depicted) that allows the user to indicate what type of electronic message is to be sent, e.g. an electronic message type icon specifying a MMS message or an email message, either without displaying the file size warning or displaying concurrently the file size warning and the file editing interface In response to detecting the first input by the user, the device displays (816) an audio or video file editing interface (e.g. 720 in FIG. 7C or attachment editing interface 518 as displayed in FIG. 5C). The audio or video file editing interface may comprise a time bar with a length that represents the audio or video file with the initial duration, a user-adjustable begin-edit icon, and a user-adjustable end-edit icon, wherein: a distance between the user-adjustable begin-edit icon and the user-adjustable end-edit icon is less than the length of the time bar, and the distance between the user-adjustable begin-edit icon and the user-adjustable end-edit icon is constrained to be equal to or less than a distance that corresponds to a predefined maximum allowable size for the audio or video file;

In some embodiments, the distance between the user-adjustable begin-edit icon and the user-adjustable end-edit icon is constrained to be less than the distance that corresponds to the predefined maximum allowable size (818). In some embodiments, the begin-edit icon and the end-edit icon are disposed in the time bar (820).

Figure 7D:
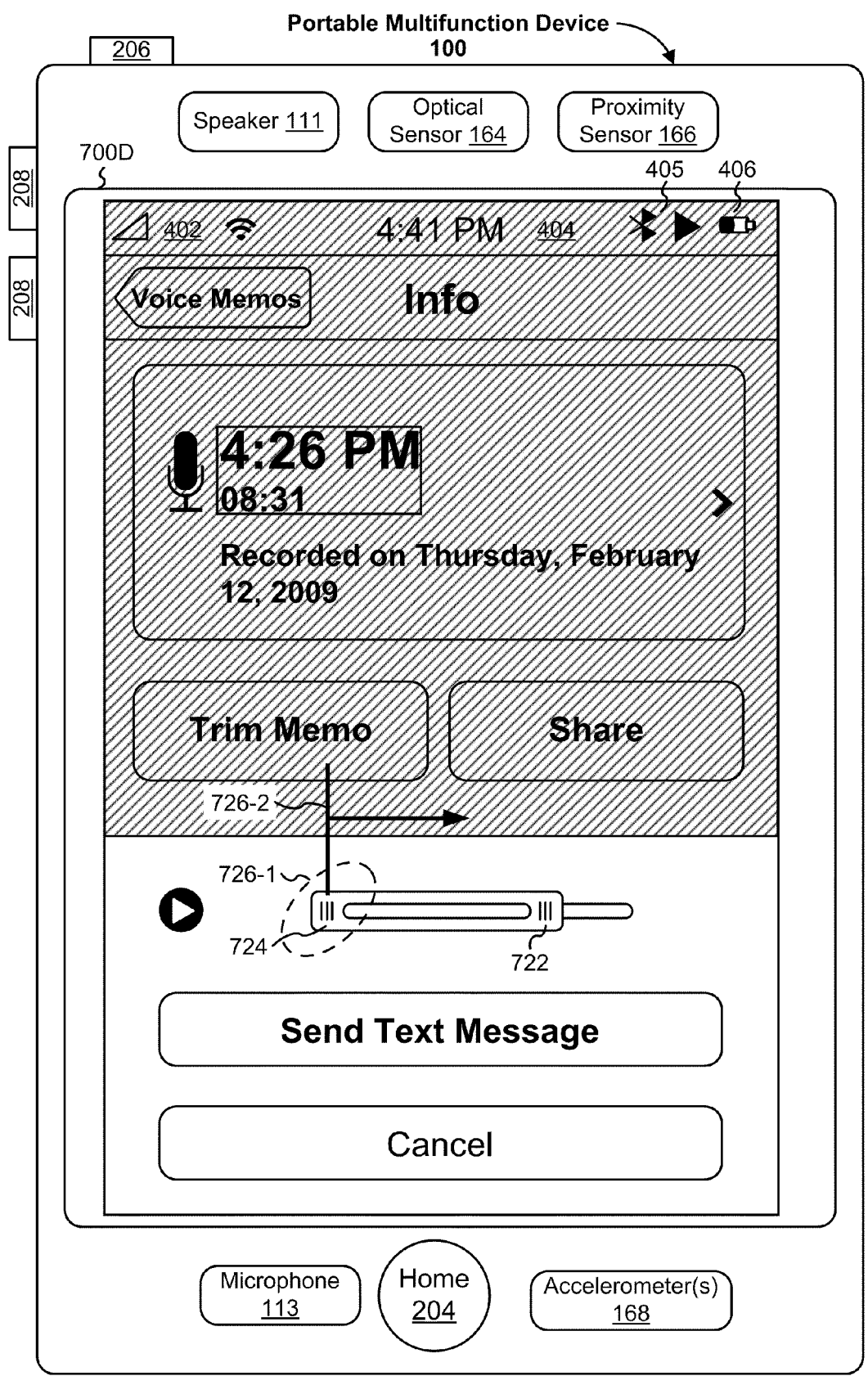
Figure 7E:
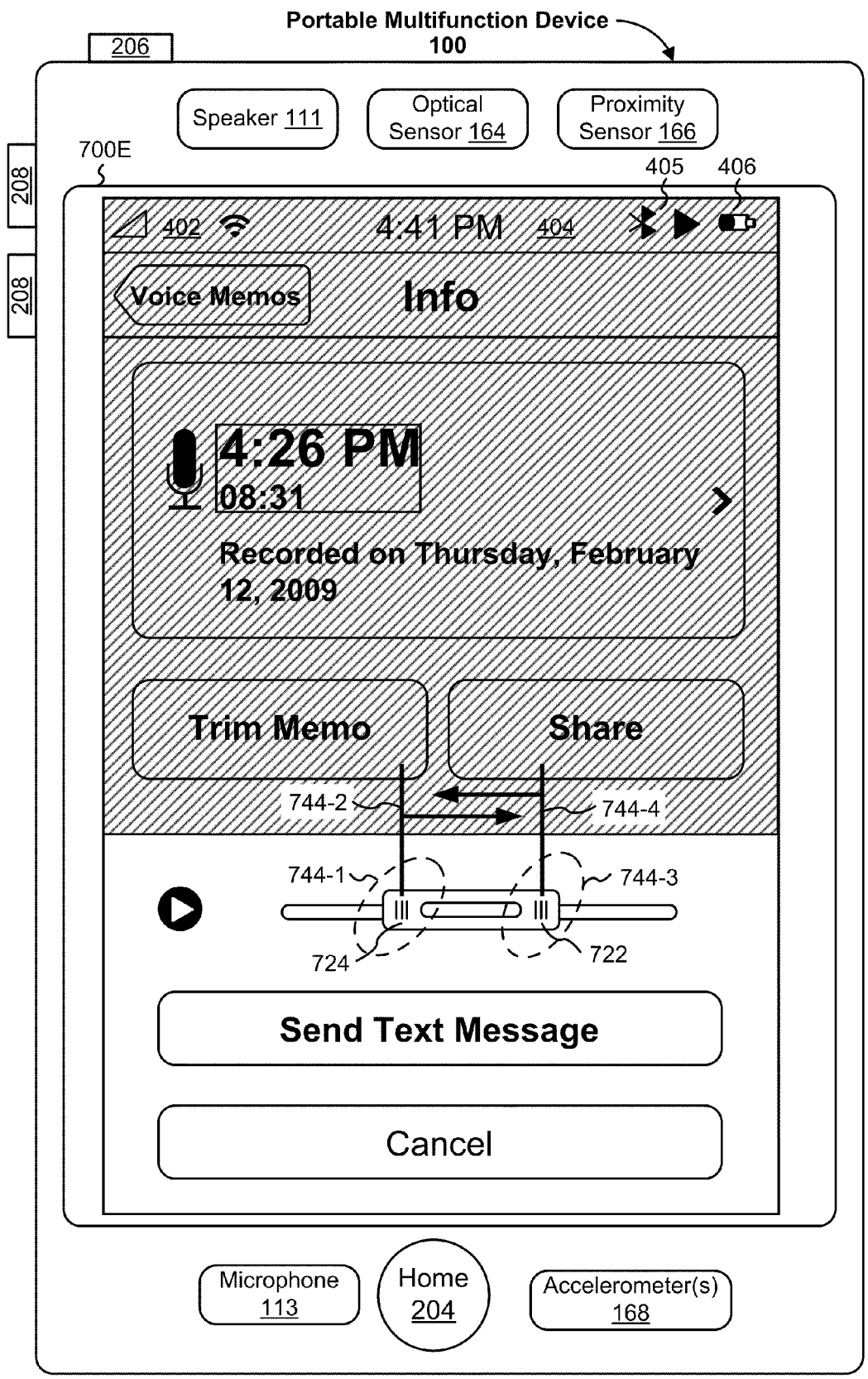
Figure 7F:
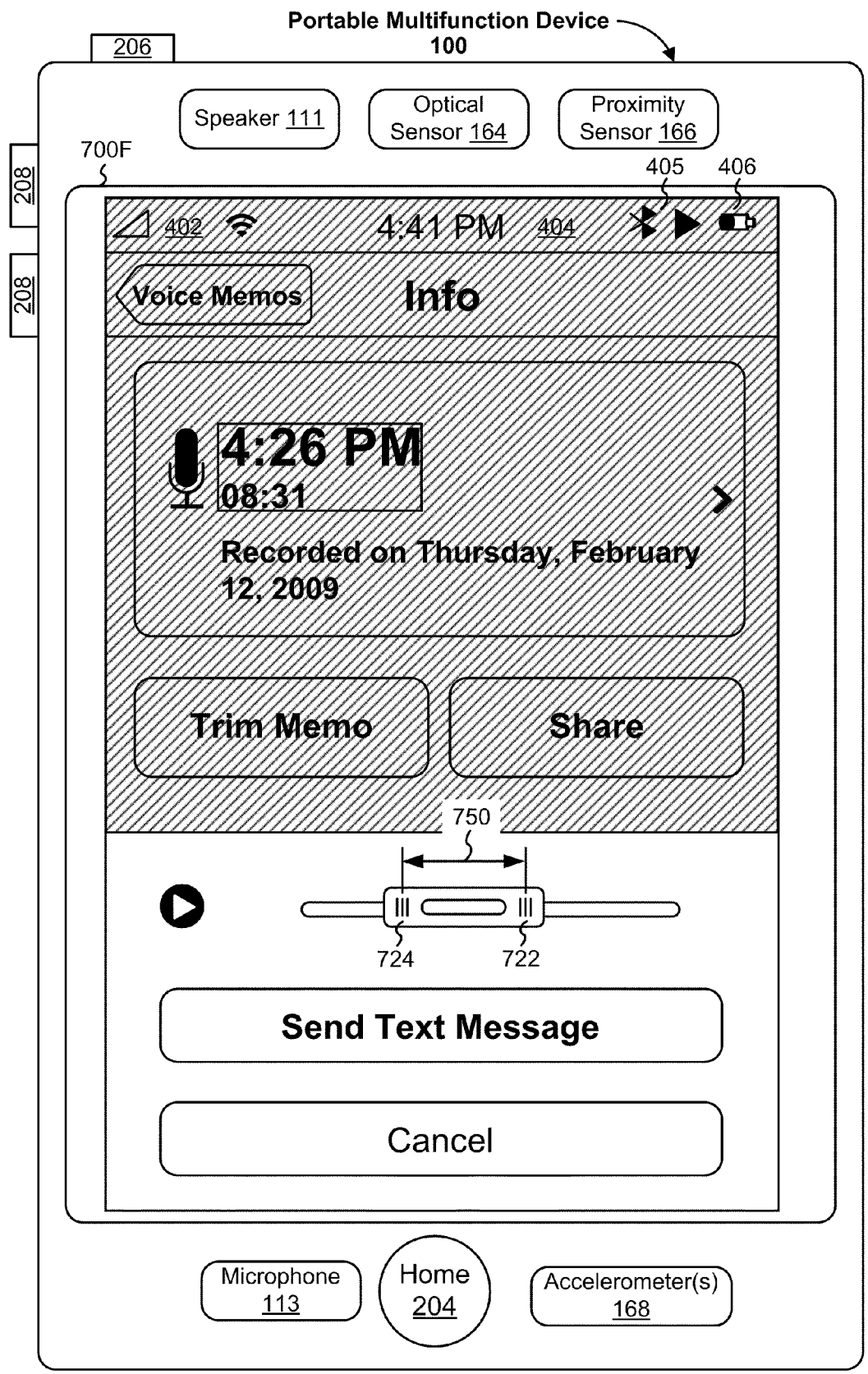
Figure 7G:
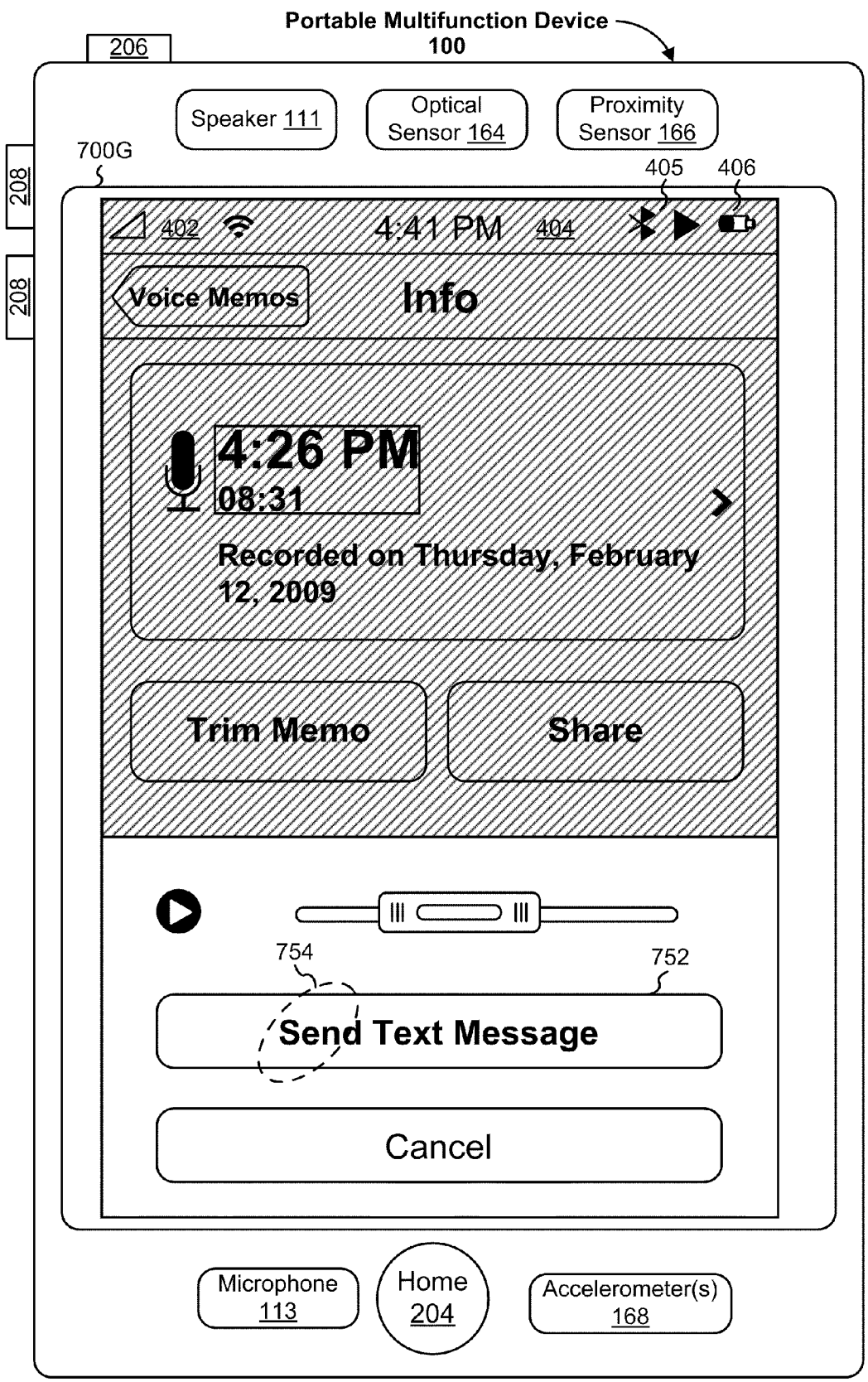

The device detects (822) a second input by the user on the touch-sensitive surface (e.g. user input 726 in FIG. 7D). In some embodiments, the second input is a finger gesture to adjust a location of the begin-edit icon on the time bar (824). In some embodiments, the second input is a finger gesture to adjust a location of the end-edit icon on the time bar (826). In some embodiments, the second input is a multi-finger gesture to adjust a location of the begin-edit icon on the time bar and a location of the end-edit icon on the time bar (828). In some embodiments, the multi-finger gesture is a pinch gesture, and wherein the pinch gesture reduces the distance between the begin-edit icon on the time bar and the end-edit icon on the time bar (830). In some embodiments, the multi-finger gesture is a depinch gesture, and wherein the depinch gesture increases the distance between the begin-edit icon on the time bar and the end-edit icon on the time bar (832). It should be noted, however, that a depinch gesture that increases the distance between the begin-edit and the end-edit icons on the time bar cannot exceed the distance corresponding to the predefined maximum allowable size for an audio or video file.

In response to detecting the second input by the user on the touch-sensitive surface, The device adjusts at least one of the begin-edit icon and the end-edit icon in the audio or video file editing interface (834) (e.g. the difference in location of begin-edit icon 724 in FIG. 7D versus FIG. 7D). The device then edits (836) the audio or video file to a second shorter duration in accordance with the adjustments to the begin-edit icon and the end-edit icon in the audio or video file editing interface.

In some embodiments, the editing (836) may be performed by attachment editing module 133 before detecting the second input, while alternatively, the editing (836) may be performed by attachment editing module 133 after detecting the second input In some embodiments, The device detects (838) a third input by the user (e.g. user input 754 on send text message button 752 in FIG. 7G), and in response to detecting the third input by the user, The device displays (838) in an electronic messaging application an icon representing the edited audio or video file with the second shorter duration. For example, the device displays icon 760 in the input area 761 in the instant messaging application depicted in UI 700H, FIG. 7H.

Figure 7H:
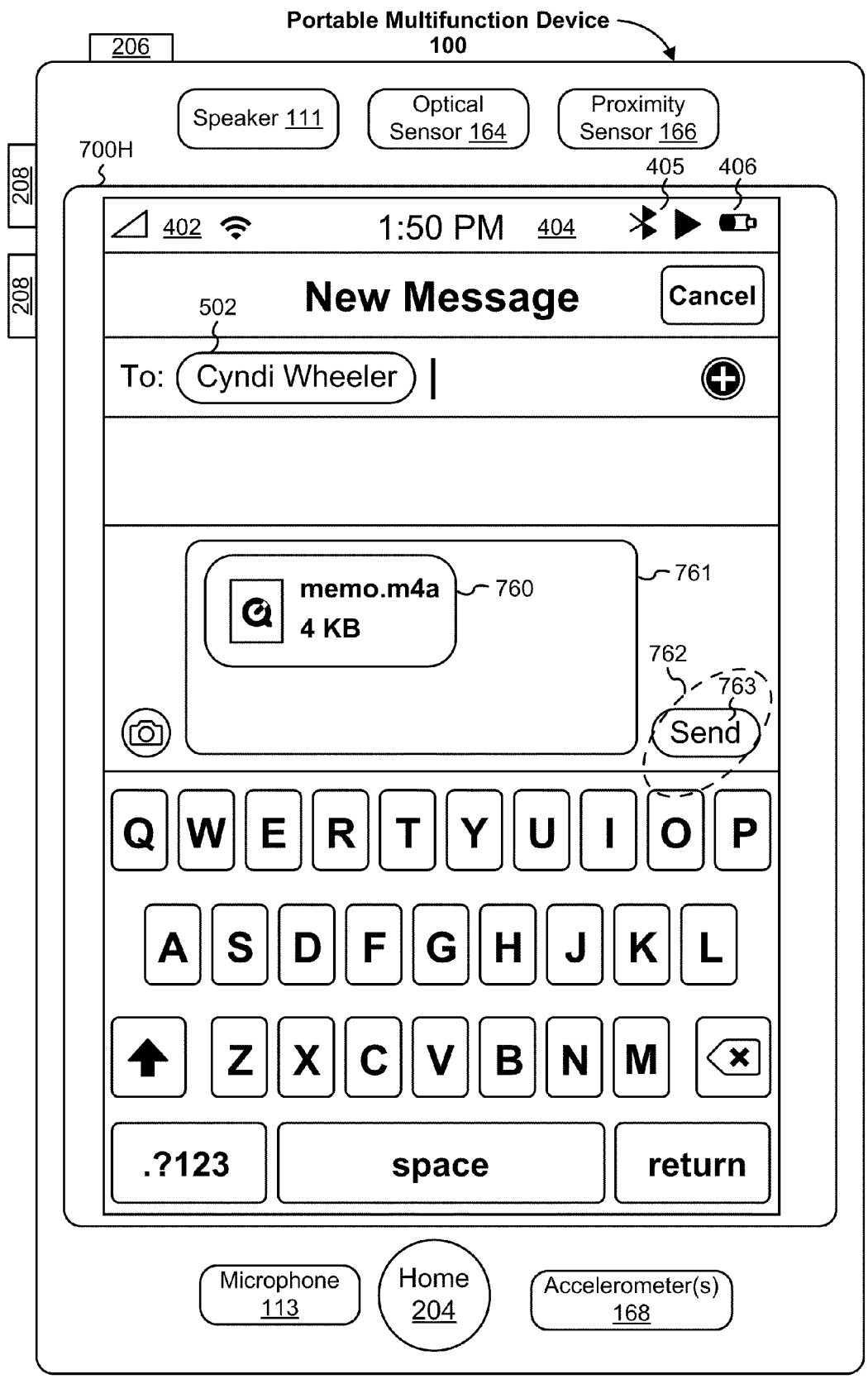
Figure 7I:
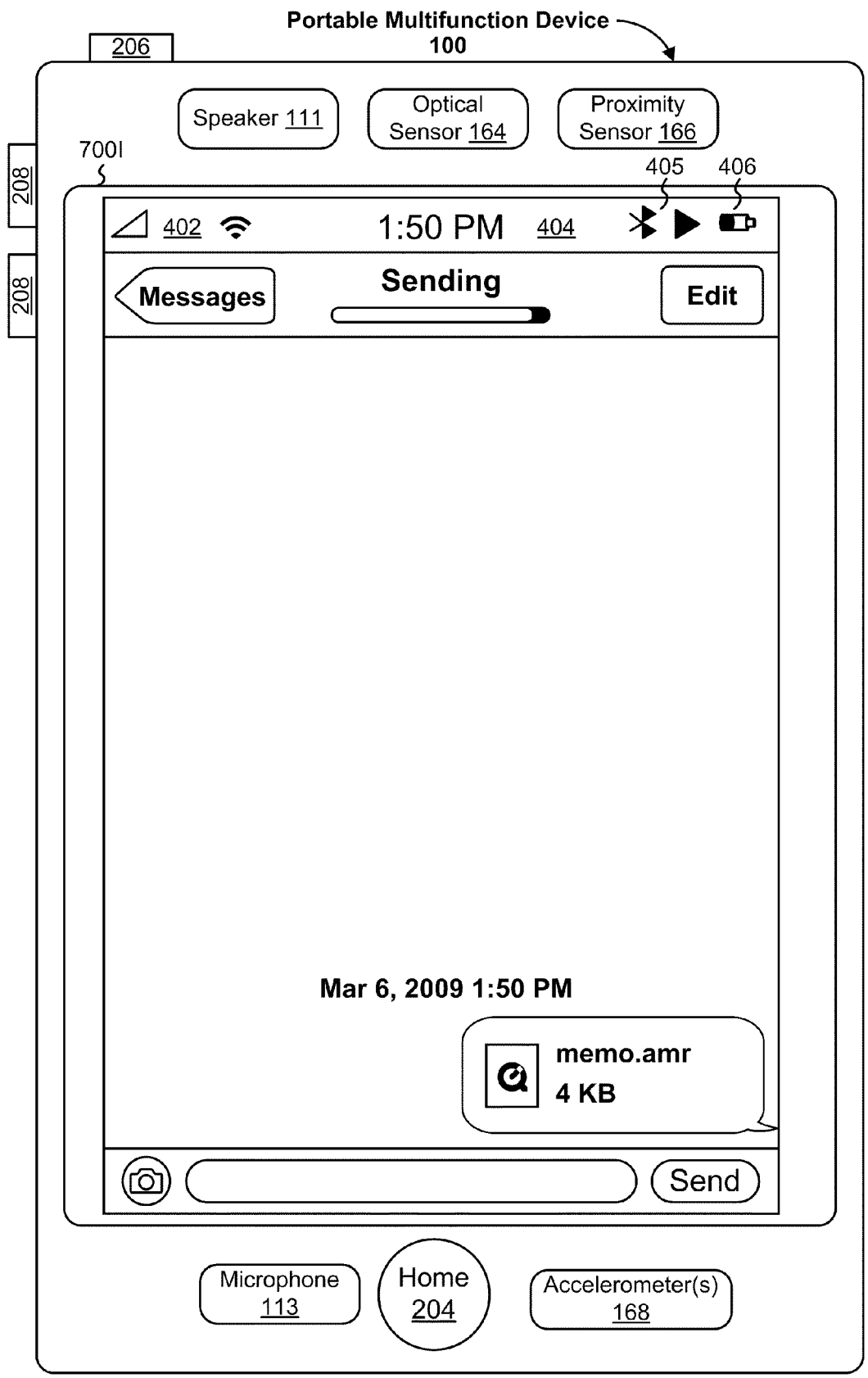
Figure 7J:
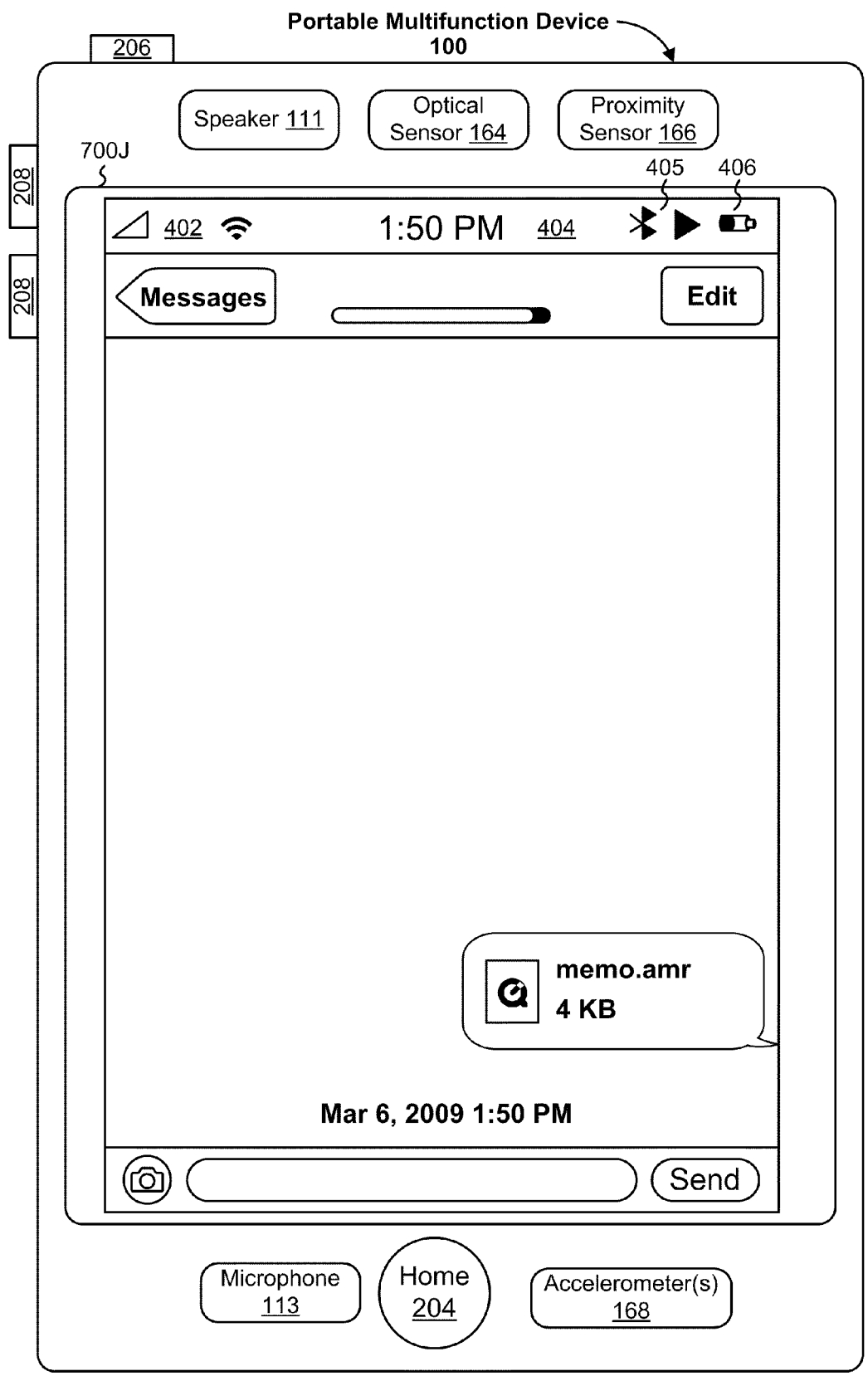

In some embodiments, The device detects (840) a fourth input by the user (e.g., a finger gesture 762 such as a tap gesture on "send" icon 763, UI 700H in FIG. 7H), and in response to detecting the fourth input by the user, the device initiates sending of the electronic message, wherein the electronic message includes the edited audio or video file with the second shorter duration.

Figure 9A:
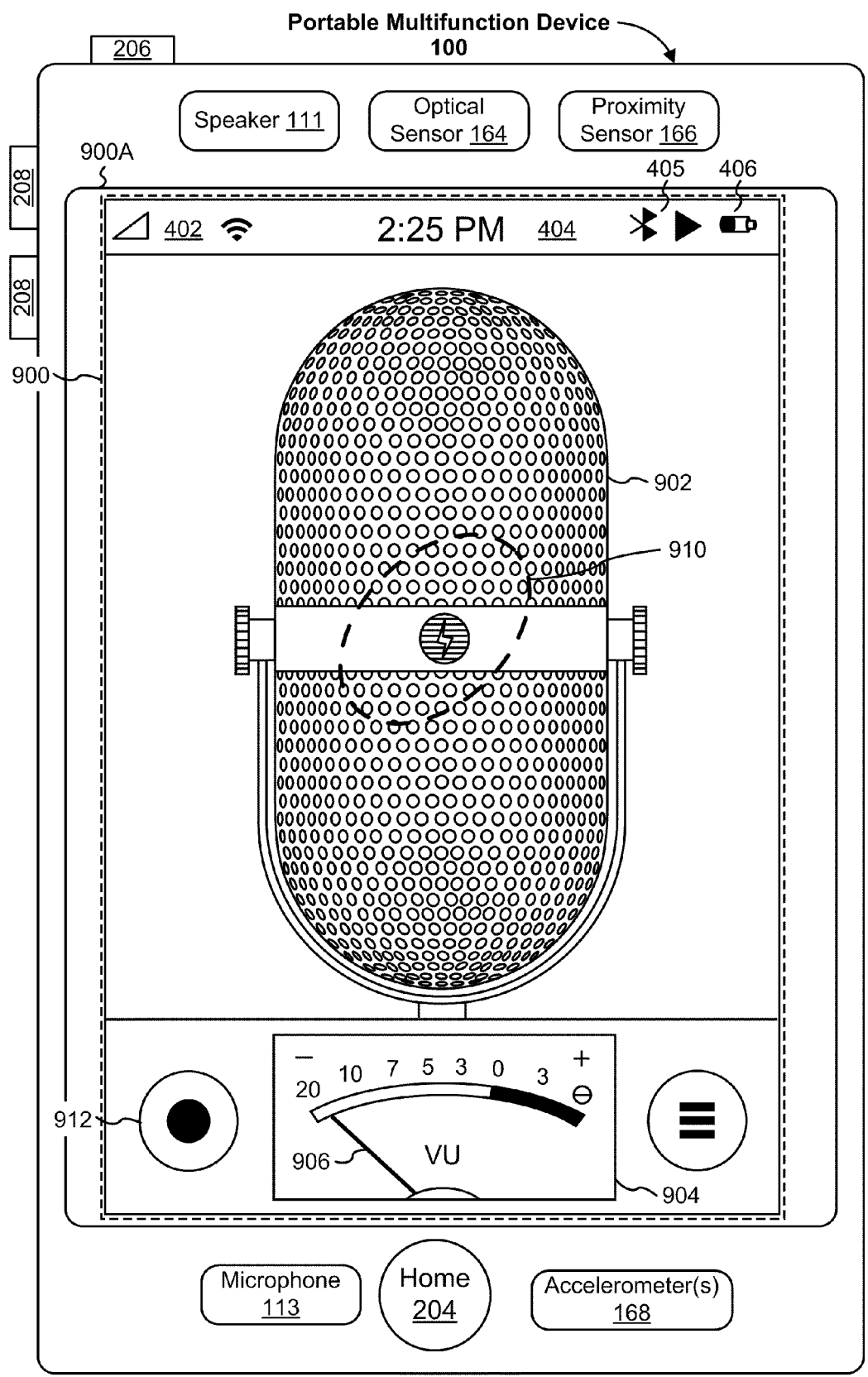
FIGS. 9A-9B illustrate exemplary user interfaces for recording audio files for sending in an electronic message in accordance with some embodiments.
Figure 9B:
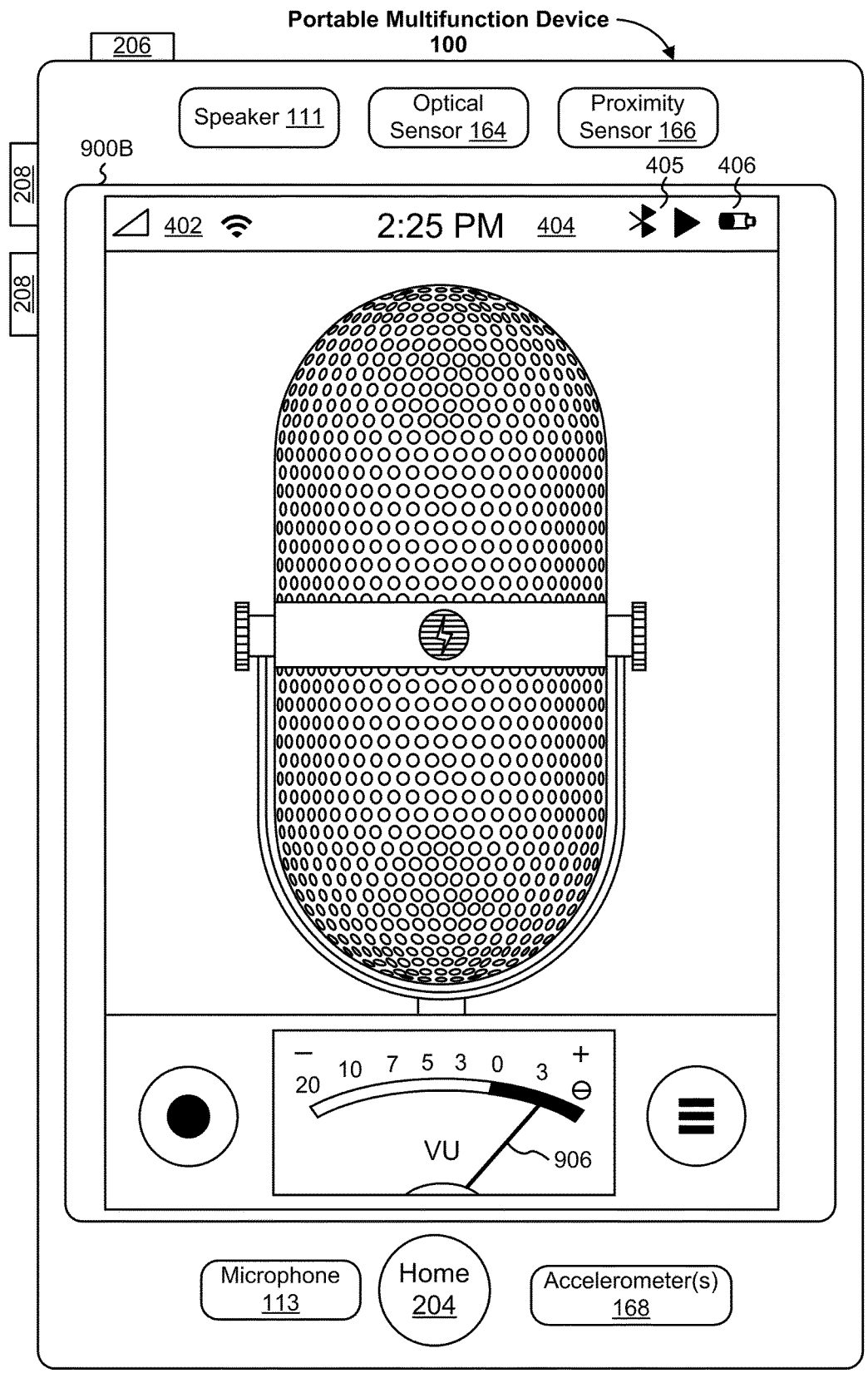

FIGS. 9A-9B illustrate exemplary user interfaces for recording audio files for sending in an electronic message.

UI 900A-UI 900B (FIGS. 9A and 9B) depict an exemplary user interface 900 for recording audio files. As depicted, user interface 900 is not in a recording state. User interface 900 comprises a microphone image 902, a Vu level meter 904, and a Vu level meter indicator 906. When user input 910 is received on microphone image 902 (e.g. a tap gesture), Vu level meter indicator 906 registers a reading by moving to an elevated position on Vu level meter 904. This behavior simulates the way a musician or public speaker would tap a microphone to be sure the microphone is receiving audio input, and may convey to a user of user interface 900 that the device is ready to record once the user toggles record button 912.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a multifunction device with a display and a touch-sensitive surface:
      while in an audio or video playback mode:
         presenting an audio or video file for playback; and
         detecting a user selection of the audio or video file to be sent in an electronic message, wherein the audio or video file has an initial duration corresponding to an initial file size;
      subsequent to detecting the user selection of the audio or video file to be sent in the electronic message, and in accordance with a determination that the initial file size of the audio or video file exceeds a predefined maximum value:

displaying a file size warning; and
entering a file editing mode
wherein entering the file editing mode includes displaying an audio or video file editing interface that includes:
a time bar with a length that represents the audio or video file with the initial duration,
a user-adjustable begin-edit icon, and
a user-adjustable end-edit icon, wherein:
a distance between the user-adjustable begin-edit icon and the user adjustable end-edit icon is less than the length of the time bar, and
the distance between the user-adjustable begin-edit icon and the user adjustable end-edit icon is constrained to be equal to or less than a distance that corresponds to a predefined maximum allowable file size for the audio or video file;
while displaying the audio or video file editing interface:
detecting a first input by the user on the touch-sensitive surface;
in direct response to detecting the first input by the user on the touch-sensitive surface, adjusting at least one of the begin-edit icon and the end-edit icon in the audio or video file editing interface; and
detecting a second input by the user; and
in direct response to detecting the second input by the user, displaying in an electronic messaging application an icon representing an edited audio or video file with a second duration that is shorter than the initial duration, the second duration corresponds with a second file size less than the predefined maximum allowable file size for the audio or video file, and the second duration in accordance with the adjustments to the begin-edit icon and the end-edit icon in the audio or video file editing interface.

2. The method of claim 1, wherein the distance between the user-adjustable begin-edit icon and the user-adjustable end-edit icon is constrained to be less than the distance that corresponds to the predefined maximum allowable file size.

3. The method of claim 1, wherein the first input is a multi-finger gesture to adjust a location of the begin-edit icon on the time bar and a location of the end-edit icon on the time bar.

4. The method of claim 3, wherein the multi-finger gesture is a pinch gesture, and wherein the pinch gesture reduces the distance between the begin-edit icon on the time bar and the end-edit icon on the time bar.

5. The method of claim 1, further comprising:
in response to detecting the second input by the user, editing the audio or video file to the second duration in accordance with the adjustments to the begin-edit icon and the end-edit icon in the audio or video file editing interface.

6. The method of claim 1, wherein the begin-edit icon and the end-edit icon are disposed in the time bar.

7. A multifunction device, comprising:
a display;
a touch-sensitive surface;
one or more processors;
memory; and
one or more programs, wherein the one or more programs are stored in the memory and configured to be executed by the one or more processors, the one or more programs including instructions for:
while in an audio or video playback mode:
presenting an audio or video file for playback; and
detecting a user selection of the audio or video file to be sent in an electronic message, wherein the audio or video file has an initial duration corresponding to an initial file size;
subsequent to detecting the user selection of the audio or video file to be sent in the electronic message, and in accordance with a determination that the initial file size of the audio or video file exceeds a predefined maximum value:
displaying a file size warning; and
entering a file editing mode
wherein entering the file editing mode includes displaying an audio or video file editing interface that includes:
a time bar with a length that represents the audio or video file with the initial duration,
a user-adjustable begin-edit icon, and
a user-adjustable end-edit icon, wherein:
a distance between the user-adjustable begin-edit icon and the user adjustable end-edit icon is less than the length of the time bar, and
the distance between the user-adjustable begin-edit icon and the user adjustable end-edit icon is constrained to be equal to or less than a distance that corresponds to a predefined maximum allowable file size for the audio or video file;
while displaying the audio or video file editing interface:
detecting a first input by the user on the touch-sensitive surface;
in direct response to detecting the first input by the user on the touch-sensitive surface, adjusting at least one of the begin-edit icon and the end-edit icon in the audio or video file editing interface; and
detecting a second input by the user; and
in direct response to detecting the second input by the user, displaying in an electronic messaging application an icon representing an edited audio or video file with a second duration that is shorter than the initial duration, the second duration corresponds with a second file size less than the predefined maximum allowable file size for the audio or video file, and the second duration in accordance with the adjustments to the begin-edit icon and the end-edit icon in the audio or video file editing interface.

8. The device of claim 7, wherein the distance between the user-adjustable begin-edit icon and the user-adjustable end-edit icon is constrained to be less than the distance that corresponds to the predefined maximum allowable file size.

9. The device of claim 7, wherein the first input is a multi-finger gesture to adjust a location of the begin-edit icon on the time bar and a location of the end-edit icon on the time bar.

10. The device of claim 9, wherein the multi-finger gesture is a pinch gesture, and wherein the pinch gesture reduces the distance between the begin-edit icon on the time bar and the end-edit icon on the time bar.

11. The device of claim 7, the one or more programs further including instructions for:
in response to detecting the second input by the user, editing the audio or video file to the second duration in accordance with the adjustments to the begin-edit icon and the end-edit icon in the audio or video file editing interface.

12. The device of claim 7, wherein the begin-edit icon and the end-edit icon are disposed in the time bar.

13. A non-transitory computer readable storage medium having stored therein instructions, which when executed by a multifunction device with a display and a touch-sensitive surface, cause the device to:
while in an audio or video playback mode:
presenting an audio or video file for playback; and
detecting a user selection of the audio or video file to be sent in an electronic message, wherein the audio or video file has an initial duration corresponding to an initial file size;
subsequent to detecting the user selection of the audio or video file to be sent in the electronic message, and in accordance with a determination that the initial file size of the audio or video file exceeds a predefined maximum value:
displaying a file size warning and an icon for entering a file editing mode when the audio or video file size exceeds a predefined maximum value; and
entering a file editing mode;
wherein entering the file editing mode includes displaying an audio or video file editing interface that includes:
a time bar with a length that represents the audio or video file with the initial duration,
a user-adjustable begin-edit icon, and
a user-adjustable end-edit icon, wherein:
a distance between the user-adjustable begin-edit icon and the user adjustable end-edit icon is less than the length of the time bar, and
the distance between the user-adjustable begin-edit icon and the user adjustable end-edit icon is constrained to be equal to or less than a distance that corresponds to a predefined maximum allowable file size for the audio or video file;
while displaying the audio or video file editing interface:
detecting a first input by the user on the touch-sensitive surface;
in direct response to detecting the first input by the user on the touch-sensitive surface, adjusting at least one of the begin-edit icon and the end-edit icon in the audio or video file editing interface; and
detecting a second input by the user; and
in direct response to detecting the second input by the user, displaying in an electronic messaging application an icon representing an edited audio or video file with a second duration that is shorter than the initial duration, the second duration corresponds with a second file size less than the predefined maximum allowable file size for the audio or video file, and the second duration in accordance with the adjustments to the begin-edit icon and the end-edit icon in the audio or video file editing interface.

14. The computer readable storage medium of claim 13, wherein the distance between the user-adjustable begin-edit icon and the user-adjustable end-edit icon is constrained to be less than the distance that corresponds to the predefined maximum allowable file size.

15. The computer readable storage medium of claim 13, wherein the first input is a multi-finger gesture to adjust a location of the begin-edit icon on the time bar and a location of the end-edit icon on the time bar.

16. The computer readable storage medium of claim 15, wherein the multi-finger gesture is a pinch gesture, and wherein the pinch gesture reduces the distance between the begin-edit icon on the time bar and the end-edit icon on the time bar.

17. The computer readable storage medium of claim 13, including instructions which cause the device to:
in response to detecting the second input by the user, edit the audio or video file to the second duration in accordance with the adjustments to the begin-edit icon and the end-edit icon in the audio or video file editing interface.

18. The computer readable storage medium of claim 13, wherein the begin-edit icon and the end-edit icon are disposed in the time bar.

* * * * *